United States Patent
Suh et al.

(10) Patent No.: US 10,313,169 B2
(45) Date of Patent: Jun. 4, 2019

(54) SYSTEM AND METHOD FOR HIGH EFFICIENCY WIRELESS LOCAL AREA NETWORK COMMUNICATIONS

(71) Applicant: Huawei Technologies Co., Ltd., Shenzhen (CN)

(72) Inventors: Jung Hoon Suh, Kanata (CA); Peiying Zhu, Kanata (CA); Osama Aboul-Magd, Kanata (CA); Kwok Shum Au, Shenzhen (CN); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/661,474

(22) Filed: Jul. 27, 2017

(65) Prior Publication Data

US 2017/0324598 A1 Nov. 9, 2017

Related U.S. Application Data

(63) Continuation of application No. 14/538,087, filed on Nov. 11, 2014, now Pat. No. 9,729,368.

(Continued)

(51) Int. Cl.
*H04L 27/26* (2006.01)
*H04L 27/00* (2006.01)

(52) U.S. Cl.
CPC ...... *H04L 27/2602* (2013.01); *H04L 27/2604* (2013.01); *H04L 27/2628* (2013.01); *H04L 27/0012* (2013.01); *H04L 27/2613* (2013.01)

(58) Field of Classification Search
CPC ............ H04L 27/2613; H04L 27/2602; H04L 27/0012; H04L 27/2604; H04L 27/2628
See application file for complete search history.

(56) References Cited

U.S. PATENT DOCUMENTS 8,073,070 B2   12/2011   Zhao et al.
8,934,413 B2   1/2015    Vermani et al.
(Continued)

FOREIGN PATENT DOCUMENTS

CN   101779409 A   7/2010
CN   102790662 A   11/2012
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.4.0, Technical Specification, Sep. 20, 2013, 120 pages.

(Continued)

*Primary Examiner* — Sophia Vlahos
(74) *Attorney, Agent, or Firm* — Slater Matsil, LLP

(57) ABSTRACT

System and method embodiments are provided for high efficiency wireless communications. In an embodiment, a method in a network component for transmitting a frame of two different fast Fourier transform (FFT) sizes includes generating a frame, wherein the frame comprises orthogonal frequency-division multiplexing (OFDM) symbols in two different FFT sizes, wherein the frame comprises a first portion and a second portion, wherein the first portion comprises a first FFT size and the second portion comprises a second FFT size; and transmitting the frame during a single transmission opportunity.

30 Claims, 5 Drawing Sheets

Related U.S. Application Data

(60) Provisional application No. 61/903,134, filed on Nov. 12, 2013.

(56) References Cited

U.S. PATENT DOCUMENTS

| | | | |
|---|---|---|---|
| 9,729,368 B2* | 8/2017 | Suh | H04L 27/2602 |
| 2005/0058089 A1 | 3/2005 | Vijayan et al. | |
| 2005/0276347 A1 | 12/2005 | Mujtaba et al. | |
| 2006/0250943 A1 | 11/2006 | Mujtaba et al. | |
| 2007/0223402 A1 | 9/2007 | Waxman | |
| 2008/0186935 A1 | 8/2008 | Ling et al. | |
| 2010/0208712 A1 | 8/2010 | Wax et al. | |
| 2011/0255620 A1* | 10/2011 | Jones, IV | H04L 5/0046 375/260 |
| 2012/0127940 A1 | 5/2012 | Lee et al. | |
| 2012/0269142 A1 | 10/2012 | Porat et al. | |
| 2013/0107912 A1* | 5/2013 | Ponnampalam | H04L 27/0008 375/147 |
| 2013/0107995 A1 | 5/2013 | Husted | |
| 2013/0127940 A1 | 5/2013 | Fujikawa | |
| 2013/0194931 A1 | 8/2013 | Lee et al. | |
| 2013/0301551 A1 | 11/2013 | Ghosh et al. | |
| 2014/0269994 A1 | 9/2014 | HomChaudhuri et al. | |
| 2014/0307650 A1 | 10/2014 | Vermani et al. | |
| 2015/0063255 A1 | 3/2015 | Tandra et al. | |
| 2016/0050093 A1 | 2/2016 | Choi et al. | |

FOREIGN PATENT DOCUMENTS

| | | |
|---|---|---|
| EP | 3039808 A1 | 7/2016 |
| JP | 2013524615 A1 | 6/2013 |
| JP | 2013192145 A | 9/2013 |
| WO | 2007061015 A1 | 5/2007 |
| WO | 2013152111 A1 | 10/2013 |
| WO | 2014171788 A1 | 10/2014 |
| WO | 2015031323 A1 | 3/2015 |

OTHER PUBLICATIONS

Chun, J. et al., "Legacy Support on HEW Frame Structure," IEEE 11-13/1057r0, Sep. 16, 2013, 8 pages.

"Part 11: Wireless LAN Medium Access Control (MAC) and Physical Layer (PHY) Specifications," IEEE Standard for Information Technology—Telecommunications and Information Exchange between Systems Local and Metropolitan Area Networks—Specific Requirements, IEEE Computer Society, IEEE Std 802.11-12, Mar. 29, 2012, 2793 pages.

Kim, J. et al., "Efficient Preamble Structures for MIMO OFDM-Based WLAN Systems," IEEE 66th Vehicular Technology Conference, 2007, 5 pages.

Ponnampalam, V., "11ac Auto-Detection: Further Results," IEEE 802.11-10/0874r0, Jul. 14, 2010, 8 pages.

* cited by examiner

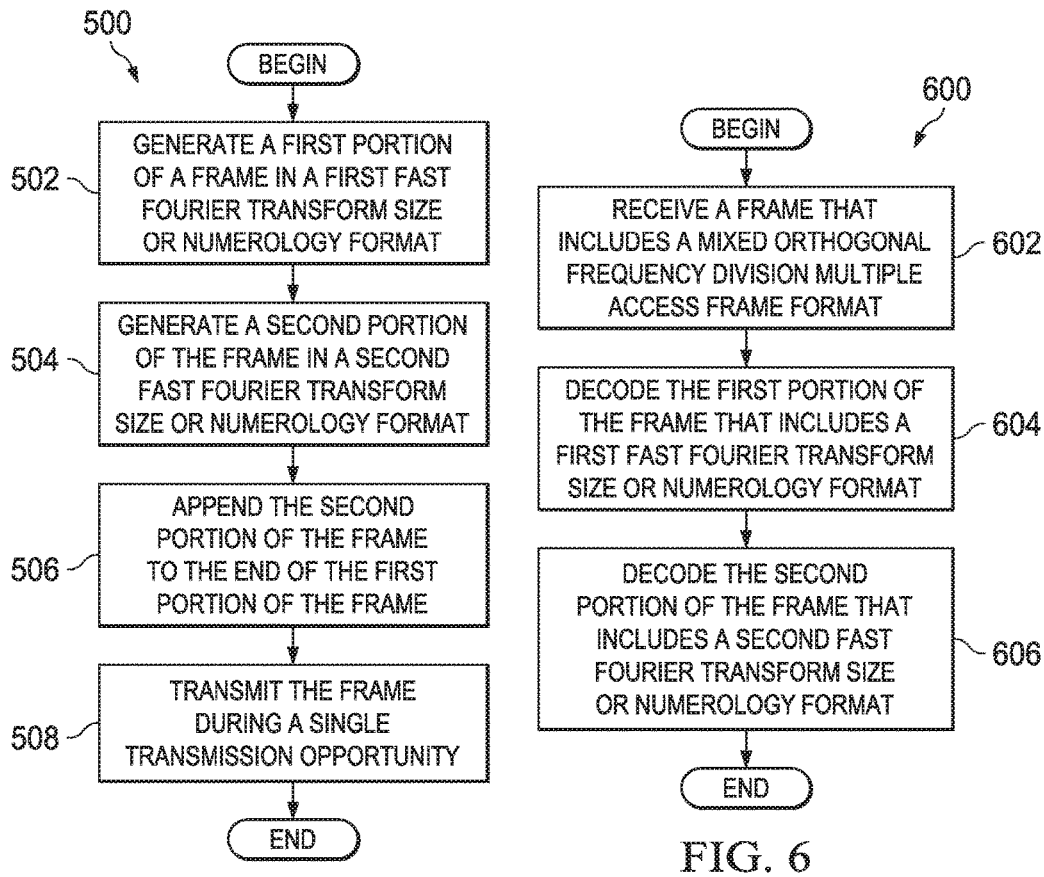
FIG. 5
FIG. 6
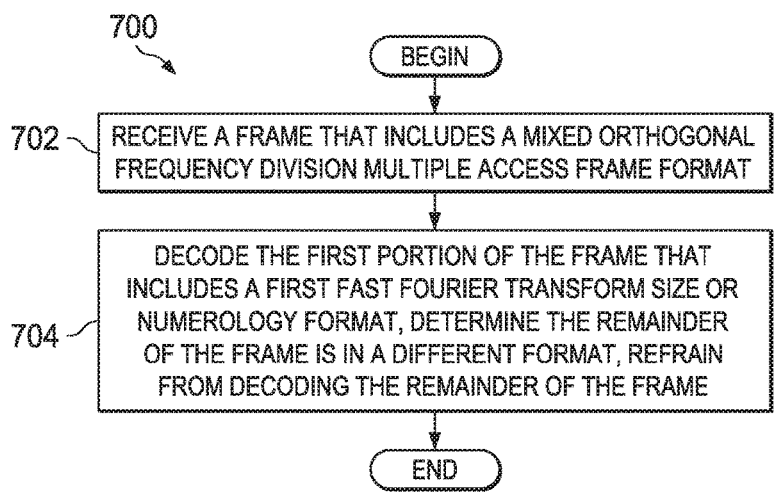
FIG. 7

SYSTEM AND METHOD FOR HIGH EFFICIENCY WIRELESS LOCAL AREA NETWORK COMMUNICATIONS

PRIORITY CLAIM AND CROSS-REFERENCE

This application is a continuation of U.S. Non-Provisional application Ser. No. 14/538,087 filed Nov. 11, 2014, titled "System and Method for High Efficiency Wireless Local Area Network Communications," which claims the benefit of the following provisionally filed U.S. Patent application: Application Ser. No. 61/903,134, filed Nov. 12, 2013, and titled "System and Method for High Efficiency Wireless Local Area Network Communications," which applications are hereby incorporated by reference.

TECHNICAL FIELD

The present invention relates to a system and method for wireless communications, and, in particular embodiments, to a system and method for high efficiency wireless local area network communications.

BACKGROUND

In 2013, the Institute of Electrical and Electronics Engineers (IEEE) formed the IEEE 802.11 high efficiency wireless local area network (WLAN) (HEW) study group in order to enhance the efficiency and performance of WLAN deployments. The HEW study group is considering the improvement of spectrum efficiency to enhance the system throughput/area in high density scenarios of access points (APs) and/or stations (STAs). However, legacy devices may not be able to utilize the new features. Therefore, it may be desirable to have systems and methods for allowing both legacy devices and HEW compliant devices to both communicate in the same wireless network.

SUMMARY

In an embodiment, a method in a network component for transmitting a frame of two different fast Fourier transform (FFT) sizes includes generating a frame, wherein the frame comprises orthogonal frequency-division multiplexing (OFDM) symbols in two different FFT sizes, wherein the frame comprises a first portion and a second portion, wherein the first portion comprises a first FFT size and the second portion comprises a second FFT size; and transmitting the frame during a single transmission opportunity.

In an embodiment, a wirelessly enabled network component includes a processor and a computer readable storage medium storing programming for execution by the processor, the programming including instructions to: generate a frame, wherein the frame comprises orthogonal frequency-division multiplexing (OFDM) symbols in two different FFT sizes, wherein the frame comprises a first portion and a second portion, wherein the first portion comprises a first FFT size and the second portion comprises a second FFT size; and transmit the frame during a single transmission opportunity.

In an embodiment, a wireless system includes a transmitter; and a processor coupled to the transmitter, wherein the processor is configured to generate a frame, wherein the frame comprises orthogonal frequency-division multiplexing (OFDM) symbols in two different FFT sizes, wherein the frame comprises a first portion and a second portion, wherein the first portion comprises a first FFT size and the second portion comprises a second FFT size, and wherein the processor is further configured to cause the transmitter to transmit the frame during a single transmission opportunity.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is a flowchart of an embodiment of a method for generating a frame with a mixed OFDMA frame format;

FIG. 6 is a flowchart of an embodiment of a method for decoding a frame that includes a mixed OFDMA frame format;

FIG. 7 is a flowchart of an embodiment of a method for decoding with a legacy wireless device a frame that includes a mixed OFDMA frame format that includes a first portion of a frame in a first FFT size or numerology format and a second portion of the frame in a second FFT size or numerology format.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
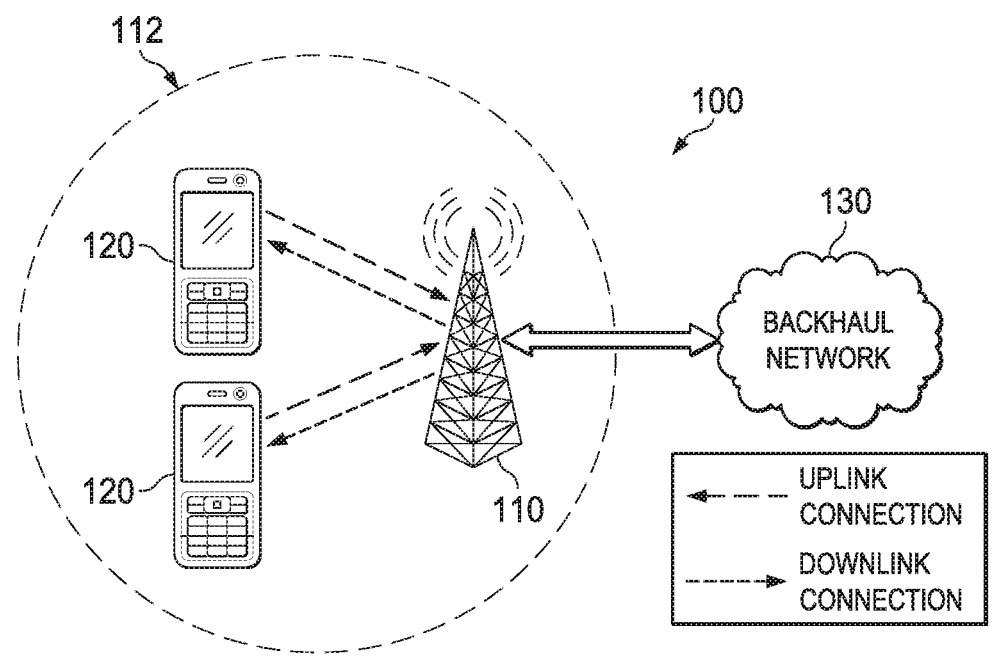
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

High efficiency WLAN (HEW) has the potential to provide improved area throughput and cell-edge performance, collaboration rather than coexistence between neighboring basic service sets (BSSs), and the use of spectrally efficient modulations, e.g., orthogonal frequency division multiple access (OFDMA) and its associated scheduler for enhanced quality of service/quality of experience (QoS/QoE).

Disclosed herein are systems and methods for transmitting data in a wireless network that includes a frame with mixed frame format with a first portion that includes a legacy frame format and a second portion that includes a HEW-data format. The first portion may be a preamble that is decodable by both legacy devices and newer devices that are HEW compliant.

Disclosed herein is an embodiment of a method in a network component for transmitting a mixed frame of wherein the mixed frame includes two segments each with a different fast Fourier transform (FFT) size from the other. The method includes generating a frame, wherein the frame comprises orthogonal frequency-division multiplexing (OFDM) symbols in two different FFT sizes in a mixed frame format, wherein the frame comprises a first portion and a second portion, wherein the first portion comprises a first FFT size and the second portion comprises a second FFT size; and transmitting the frame during a single transmission opportunity. In an embodiment, the first portion includes a preamble in a legacy format. In a method, according to one example embodiment, the frame includes a first field and a second field, and wherein the first field provides information for automatic gain control (AGC) and synchronization and the second field provides information for synchronization and channel estimation. In an embodiment, the first portion includes a first field and a second field that provide information enabling a receiver to estimate two stream channels for two stream space-time block code (STBC). In an embodiment, the first portion includes a frame control field and wherein the frame control field comprises two symbols causing a legacy device to stop decoding the frame when encountered by an auto-detection mechanism. In an embodiment, the frame includes common reference sequences (CRS) for channel estimation. In an embodiment, the number of symbols in which the CRS is inserted is determined according to the number of physical antennas. In an embodiment, the frame includes a data demodulation reference sequences (DMRS). In an embodiment, the number of symbols in which the DMRS is inserted is determined according to the number of transmission streams.

Disclosed herein is a method in a wireless network device for receiving and decoding a mixed format frame. The method includes receiving a frame, wherein the frame that includes OFDM symbols in two different FFT sizes. The frame includes a first portion and a second portion, wherein the first portion includes a first FFT size and the second portion includes a second FFT size. The method also includes decoding the first portion according to the first FFT size, wherein the first portion is a preamble and decoding the second portion according to the second FFT size, wherein the second portion is a data portion of the frame.

FIG. 1 illustrates a network 100 for communicating data. The network 100 comprises an access point (AP) 110 having a coverage area 112, a plurality of user equipment (UEs) 120, and a backhaul network 130. As used herein, the term AP may also be referred to as a transmission point (TP) and the two terms may be used interchangeably throughout this disclosure. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

In an embodiment, the AP 110 is configured to transmit in a mixed OFDMA frame format. The mixed OFDMA frame format may be decodable by both legacy WLAN devices that are not otherwise compatible with newer wireless and WLAN protocols and new wireless devices configured for HEW standards. In an embodiment, the AP 110 is a cellular AP. In another embodiment, the AP 110 is a WiFi AP.

Figure 2:
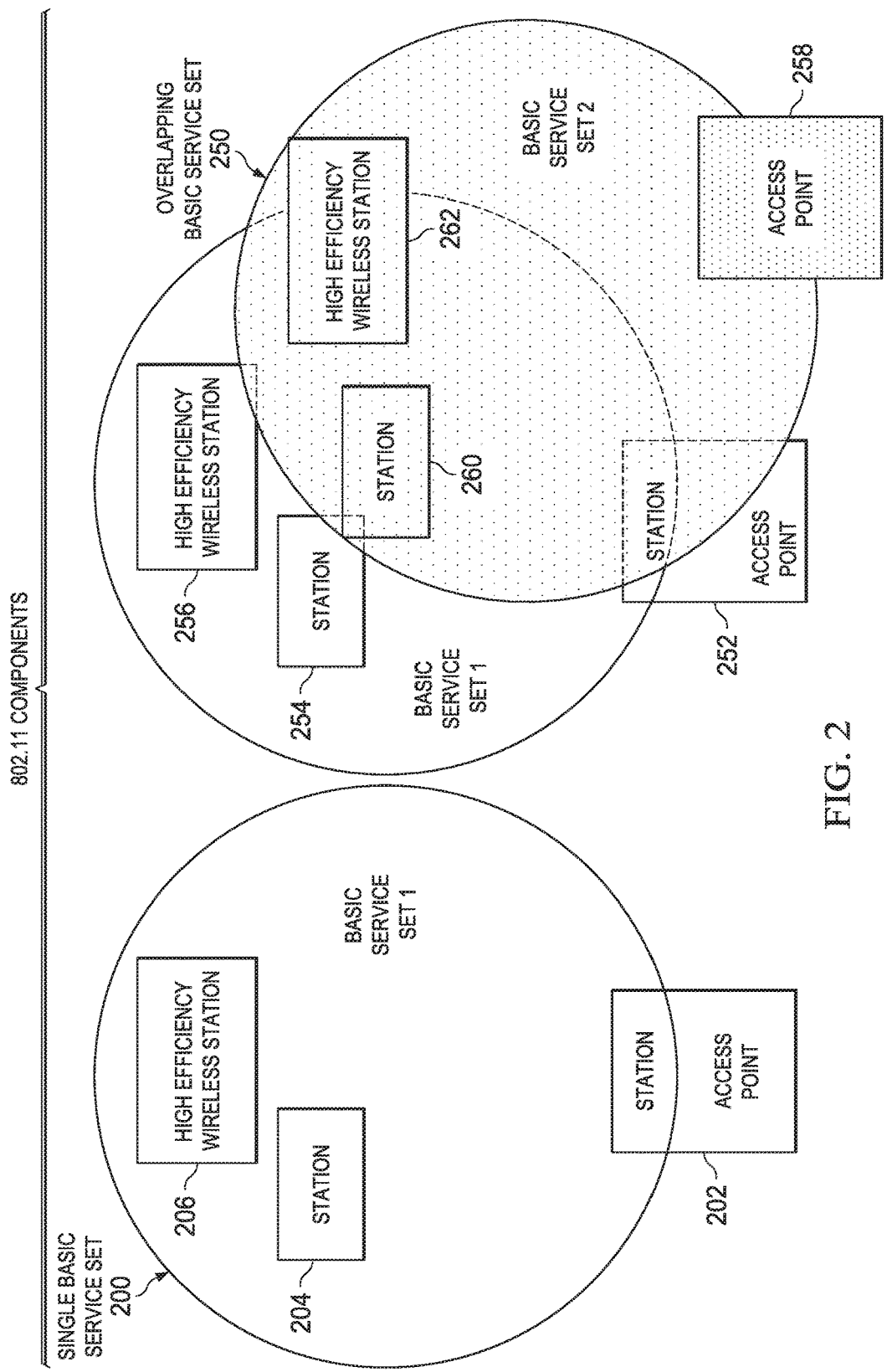
FIG. 2 illustrates various IEEE 802.11 architectures.

FIG. 2 illustrates various IEEE 802.11 architectures. In one example, a high efficiency WLAN system 200 is shown in a single basic service set (BSS) environment that contains a single AP 202 with a mix of legacy STAs 204 and HEW STAs 206. HEW increases the BSS overall throughput while supporting legacy STAs.

In another example, a second high efficiency WLAN system 250 is shown in an overlapping BSS (OBSS) environment, in which multiple APs 252, 258 supports their own BSSs (BSS 1 and BSS 2) with both mixed legacy STAs 254, 260 and HEW STAs 256, 262. HEW reduces the interference, increases the area throughput, and may include the support of legacy STAs 254, 260.

Various embodiments provide one or more of a frame format, reference sequences, and tone mapping for OFDMA WLAN. The frame structure is designed to support backward compatibility. An embodiment includes a mixed frame format. The frame control field in the frame format carries relatively important information such as MAP configuration, and it provides an auto-detection scheme as well. The auto-detection scheme allows a legacy device to stop decoding the HEW frame when the legacy device encounters this frame control field.

An embodiment includes a tone mapping per 20 megahertz (MHz), as the numerology is changed from 64 tones to 512 or 1024 tones per 20 MHz. As used herein the term numerology means the number of tones per OFDM symbol. The terms FFT size and numerology format are used interchangeably throughout this disclosure. While embodiments are described using a number of tones per 20 MHz as 512 or 1024, but there may be any number of tones.

An embodiment provides reference sequences (RSs) for channel estimation of OFDMA packets. The common RS (CRS) is designed for the beamforming report. The channel for all the subcarriers per symbol is estimated by all the participating devices in an OFDMA scheduler through the CRS. The data demodulation RS (DMRS) is used for the effective channel estimation of each STA, so the DMRS is designed per resource unit (RU). The DMRS patterns for STAs whose RUs are assigned with the different number of units may be different, based on the number of assigned RUs.

An embodiment includes a mixed frame structure that provides auto-detection functionality between legacy devices and HEW devices. An embodiment uses space-time block code (STBC) based quadrature phase shift keying (QPSK) or QPSK with a receiver diversity scheme for the frame control field. An embodiment includes reference sequence patterns designed for channel sounding and data demodulation. Embodiments may be implemented in legacy devices (e.g., 802.11n/ac devices) as well as HEW devices. Embodiments may be implemented in Wi-Fi enterprise, STAs, and APs.

Frame Format

As OFDMA technology sees increased usage in future generations of WLAN standards (e.g., 802.11 HEW), it is useful to provide a frame format that is backward compatible with legacy WLAN devices.

Figure 3:
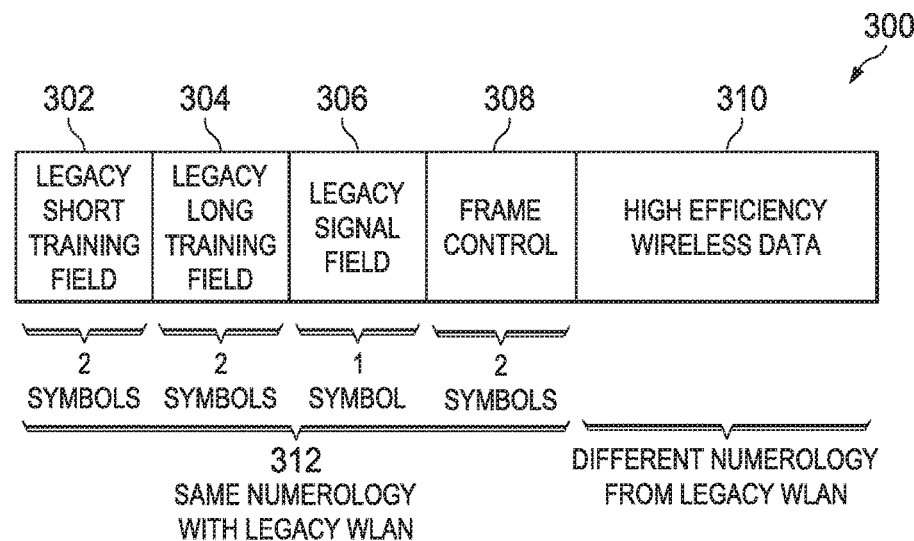
FIG. 3 illustrates a mixed OFDMA frame format with a HEW-data portion having a numerology that may be different from the legacy WLAN portion.

With respect to 20 MHz OFDMA transmission, FIG. 3 illustrates a mixed OFDMA frame 300 format with a HEW-data portion 310 having a numerology that may be different from the legacy WLAN portion 312. As used herein the term numerology means the number of tones per OFDM symbol. For example, in an embodiment, the HEW-data portion 310 may have 512 or 1024 tones per 20 MHz symbol, and the OFDM portion 312 with the legacy numerology may have 64 tones per 20 MHz symbol. In other embodiments, the HEW-data portion 310 may have a different number of tones per 20 MHz symbol other than 512 or 1024. In other embodiments, the mixed OFDMA frame 300 may be transmitted in a different frequency from 20 MHz.

In an embodiment, the frame format 300 includes a HEW-data portion 310 and a legacy portion 312. The legacy portion 312 includes legacy preamble elements such as the legacy short training field (L-STF) 302, the legacy long training field (L-LTF) 304, and the legacy signal field (L-SIG) 306 which are a legacy preamble portion of the frame 300. All devices, including legacy devices, may use the preamble portion of the frame 300 to determine the frame length. In an embodiment, the L-STF is about 2 symbols, the L-LTF is 2 symbols, the L-SIG 306 is 1 symbol, and the frame control field 308 is 2 symbols. In other embodiments, the number of symbols that comprise each of the L-STF 302, the L-LTF 304, the L-SIG 306, and the frame control field 308 may be different from that shown and described in FIG. 3. In an embodiment, while the L-SIG 306 provides the length information of the frame, the L-STF 302 and L-LTF 304 provide the synchronization and channel estimation for the OFDMA HEW-data portion 310 as well as for the legacy portion 312. The frame control symbols 308 carry information used for OFDMA data transmission, such as downlink/uplink (DL/UL) MAP configuration, DL/UL acknowledgement (ACK) configuration, etc. The frame control symbols 308 also become a transition period between the legacy portion 312 and the HEW-data portion 310. IEEE 802.11ac and 802.11n devices (i.e., legacy devices) stop decoding when they encounter frame control symbols 308 that are differently modulated, using an auto-detection mechanism. The frame control symbols 308 can be QPSK modulated, so the frame control symbols carry more information bits compared to the binary phase-shift keying (BPSK) modulated symbols. A HEW device can have at least two receiver (RX) antennas, and the RX diversity may be applied in receiving the signal. This can aid in achieving the same reliable communication as the current legacy SIG field transmission modulated in BPSK without the RX diversity. Those QPSK modulated frame control symbols provide the auto-detection functionality, and the legacy devices stop decoding the frame as they encounter the differently modulated frame control symbols.

Figure 4:
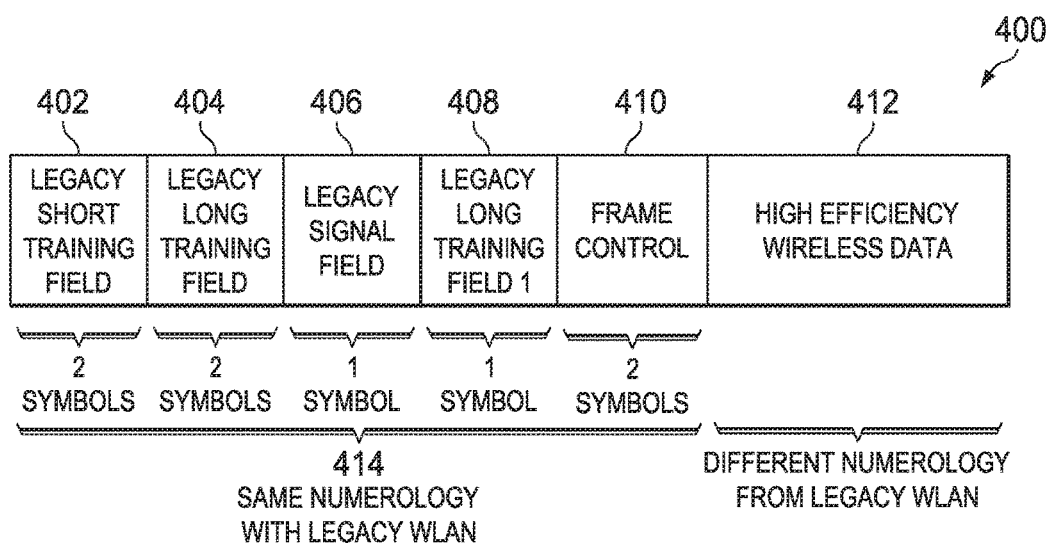
FIG. 4 illustrates a mixed OFDMA frame format with STBC based frame control symbols.

FIG. 4 illustrates a mixed OFDMA frame format 400 with STBC based frame control symbols. Frame format 400 includes a legacy portion 414 and a HEW-data portion 412. The legacy portion 414 includes L-STF 402, L-LTF 404, L-SIG field 406, L-LTF1 408, and a frame control field 410. In an embodiment, the L-STF 402 may be 2 symbols, the L-LTF 404 may be 2 symbols, the L-SIG 406 may be 1 symbol, the L-LTF1 408 may be 1 symbol, and the frame control field 410 may be 2 symbols. In other embodiments, the symbol lengths for the fields L-STF 402, L-LTF 404, L-SIG 406, the L-LTF1 408, and the frame control field 410 may be different from those described and shown in FIG. 4. In an embodiment, one OFDM symbol, that is, L-LTF1 408 in FIG. 4, is inserted to enable the STBC-based frame control symbols to be decoded at the RX. One LTF from the L-LTF symbols 404 and another with L-LTF1 408 are used to estimate the two stream channels for two streams STBC, that is, the Alamouti Scheme, to be decoded at the RX. Because the reliability of the packet transmission is achieved with the STBC, the frame control symbols may be modulated with QPSK, and the L-LTF1 408 and the first symbol of frame control symbols 410 with QPSK modulation make an auto-detection between the legacy devices and the HEW devices. That is, the legacy devices stop decoding the frame when they are encountered with the L-LTF1 408 and the first symbol of the frame control symbols 410.

Tone Mapping for the OFDMA Symbol with 512 Tones Per 20 MHz Symbol

In using 512 tones for a 20 MHz OFDM/OFDMA symbol in a WLAN system, an embodiment sets the guard band and DC null subcarriers. An embodiment sets the first 23 tones and the last 22 tones aside for the guard band purpose, and also sets the $256^{th}$, $257^{th}$, and $258^{th}$ subcarriers aside for the DC nulls. That is, among the subcarriers with the index 0 to 511, the index 0 to 22 and 490 to 511 are guard band tones, and the tone indexes 255, 256 and 257 are set aside for the DC nulls.

Common Reference Sequence Pattern

In an embodiment, the common reference sequence (CRS) used for channel estimation of the multiple actual physical antennas between the TX and the RX in the OFDMA data portion has the following patterns. CRS is used for channel sounding, which is used for beam-forming feedback.

The location of the LTS in the L-LTF is reused for positioning the CRS of the new OFDMA symbol, and the L-LTF is one of the CRS for the OFDMA symbol.

Table 1 illustrates an embodiment CRS pattern.

TABLE 1

|    | using L-LTF | OFDMA-1 | OFDMA-2 | OFDMA-3 | OFDMA-4 | OFDMA-5 | OFDMA-6 | OFDMA-7 |
|----|-------------|---------|---------|---------|---------|---------|---------|---------|
| 0  | GB | GB | GB | GB | GB | GB | GB | GB |
| 1  | GB | GB | GB | GB | GB | GB | GB | GB |
| 2  | GB | GB | GB | GB | GB | GB | GB | GB |
| 3  | GB | GB | GB | GB | GB | GB | GB | GB |
| 4  | GB | GB | GB | GB | GB | GB | GB | GB |
| 5  | GB | GB | GB | GB | GB | GB | GB | GB |
| 6  | GB | GB | GB | GB | GB | GB | GB | GB |
| 7  | GB | GB | GB | GB | GB | GB | GB | GB |
| 8  | GB | GB | GB | GB | GB | GB | GB | GB |
| 9  | GB | GB | GB | GB | GB | GB | GB | GB |
| 10 | GB | GB | GB | GB | GB | GB | GB | GB |
| 11 | GB | GB | GB | GB | GB | GB | GB | GB |
| 12 | GB | GB | GB | GB | GB | GB | GB | GB |
| 13 | GB | GB | GB | GB | GB | GB | GB | GB |
| 14 | GB | GB | GB | GB | GB | GB | GB | GB |
| 15 | GB | GB | GB | GB | GB | GB | GB | GB |
| 16 | GB | GB | GB | GB | GB | GB | GB | GB |
| 17 | GB | GB | GB | GB | GB | GB | GB | GB |
| 18 | GB | GB | GB | GB | GB | GB | GB | GB |
| 19 | GB | GB | GB | GB | GB | GB | GB | GB |
| 20 | GB | GB | GB | GB | GB | GB | GB | GB |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 21 | GB | GB | GB | GB | GB | GB | GB | GB |
| 22 | GB | GB | GB | GB | GB | GB | GB | GB |
| 23 | | | | | | | | |
| 24 | | | | | | | | |
| 25 | | | | | | | | |
| 26 | | | | | | | | |
| 27 | | | | | | | | |
| 28 | | | | | | | | |
| 29 | | | | | | | | |
| 30 | | | | | | | | |
| 31 | | | | | | | | |
| 32 | 1 | 1 | 1 | 1 | 1 | 1 | 1 | 1 |
| 33 | | | | | | | | |
| 34 | | | | | | | | |
| 35 | | | | | | | | |
| 36 | | | | | | | | |
| 37 | | | | | | | | |
| 38 | | | | | | | | |
| 39 | | | | | | | | |
| 40 | 1 | 1 | 1 | 1 | 1 | 1 | 1 | 1 |
| 41 | | | | | | | | |
| 42 | | | | | | | | |
| 43 | | | | | | | | |
| 44 | | | | | | | | |
| 45 | | | | | | | | |
| 46 | | | | | | | | |
| 47 | | | | | | | | |
| 48 | 1 | 1 | 1 | 1 | 1 | 1 | 1 | 1 |
| 49 | | | | | | | | |
| 50 | | | | | | | | |
| 51 | | | | | | | | |
| 52 | | | | | | | | |
| 53 | | | | | | | | |
| 54 | | | | | | | | |
| 55 | | | | | | | | |
| 56 | 1 | 1 | 1 | 1 | 1 | 1 | 1 | 1 |
| 57 | | | | | | | | |
| 58 | | | | | | | | |
| 59 | | | | | | | | |
| 60 | | | | | | | | |
| 61 | | | | | | | | |
| 62 | | | | | | | | |
| 63 | | | | | | | | |
| 64 | −1 | −1 | −1 | −1 | −1 | −1 | −1 | −1 |
| 65 | | | | | | | | |
| 66 | | | | | | | | |
| 67 | | | | | | | | |
| 68 | | | | | | | | |
| 69 | | | | | | | | |
| 70 | | | | | | | | |
| 71 | | | | | | | | |
| 72 | −1 | −1 | −1 | −1 | −1 | −1 | −1 | −1 |
| 73 | | | | | | | | |
| 74 | | | | | | | | |
| 75 | | | | | | | | |
| 76 | | | | | | | | |
| 77 | | | | | | | | |
| 78 | | | | | | | | |
| 79 | | | | | | | | |
| 80 | 1 | 1 | 1 | 1 | 1 | 1 | 1 | 1 |
| 81 | | | | | | | | |
| 82 | | | | | | | | |
| 83 | | | | | | | | |
| 84 | | | | | | | | |
| 85 | | | | | | | | |
| 86 | | | | | | | | |
| 87 | | | | | | | | |
| 88 | 1 | 1 | 1 | 1 | 1 | 1 | 1 | 1 |
| 89 | | | | | | | | |
| 90 | | | | | | | | |
| 91 | | | | | | | | |
| 92 | | | | | | | | |
| 93 | | | | | | | | |
| 94 | | | | | | | | |
| 95 | | | | | | | | |
| 96 | −1 | −1 | −1 | −1 | −1 | −1 | −1 | −1 |
| 97 | | | | | | | | |
| 98 | | | | | | | | |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 99 | | | | | | | | |
| 100 | | | | | | | | |
| 101 | | | | | | | | |
| 102 | | | | | | | | |
| 103 | | | | | | | | |
| 104 | 1 | 1 | 1 | 1 | 1 | 1 | 1 | 1 |
| 105 | | | | | | | | |
| 106 | | | | | | | | |
| 107 | | | | | | | | |
| 108 | | | | | | | | |
| 109 | | | | | | | | |
| 110 | | | | | | | | |
| 111 | | | | | | | | |
| 112 | −1 | −1 | −1 | −1 | −1 | −1 | −1 | −1 |
| 113 | | | | | | | | |
| 114 | | | | | | | | |
| 115 | | | | | | | | |
| 116 | | | | | | | | |
| 117 | | | | | | | | |
| 118 | | | | | | | | |
| 119 | | | | | | | | |
| 120 | 1 | 1 | 1 | 1 | 1 | 1 | 1 | 1 |
| 121 | | | | | | | | |
| 122 | | | | | | | | |
| 123 | | | | | | | | |
| 124 | | | | | | | | |
| 125 | | | | | | | | |
| 126 | | | | | | | | |
| 127 | | | | | | | | |
| 128 | 1 | 1 | 1 | 1 | 1 | 1 | 1 | 1 |
| 129 | | | | | | | | |
| 130 | | | | | | | | |
| 131 | | | | | | | | |
| 132 | | | | | | | | |
| 133 | | | | | | | | |
| 134 | | | | | | | | |
| 135 | | | | | | | | |
| 136 | 1 | 1 | 1 | 1 | 1 | 1 | 1 | 1 |
| 137 | | | | | | | | |
| 138 | | | | | | | | |
| 139 | | | | | | | | |
| 140 | | | | | | | | |
| 141 | | | | | | | | |
| 142 | | | | | | | | |
| 143 | | | | | | | | |
| 144 | 1 | 1 | 1 | 1 | 1 | 1 | 1 | 1 |
| 145 | | | | | | | | |
| 146 | | | | | | | | |
| 147 | | | | | | | | |
| 148 | | | | | | | | |
| 149 | | | | | | | | |
| 150 | | | | | | | | |
| 151 | | | | | | | | |
| 152 | 1 | 1 | 1 | 1 | 1 | 1 | 1 | 1 |
| 153 | | | | | | | | |
| 154 | | | | | | | | |
| 155 | | | | | | | | |
| 156 | | | | | | | | |
| 157 | | | | | | | | |
| 158 | | | | | | | | |
| 159 | | | | | | | | |
| 160 | 1 | 1 | 1 | 1 | 1 | 1 | 1 | 1 |
| 161 | | | | | | | | |
| 162 | | | | | | | | |
| 163 | | | | | | | | |
| 164 | | | | | | | | |
| 165 | | | | | | | | |
| 166 | | | | | | | | |
| 167 | | | | | | | | |
| 168 | −1 | −1 | −1 | −1 | −1 | −1 | −1 | −1 |
| 169 | | | | | | | | |
| 170 | | | | | | | | |
| 171 | | | | | | | | |
| 172 | | | | | | | | |
| 173 | | | | | | | | |
| 174 | | | | | | | | |
| 175 | | | | | | | | |
| 176 | −1 | −1 | −1 | −1 | −1 | −1 | −1 | −1 |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 177 | | | | | | | | |
| 178 | | | | | | | | |
| 179 | | | | | | | | |
| 180 | | | | | | | | |
| 181 | | | | | | | | |
| 182 | | | | | | | | |
| 183 | | | | | | | | |
| 184 | 1 | 1 | 1 | 1 | 1 | 1 | 1 | 1 |
| 185 | | | | | | | | |
| 186 | | | | | | | | |
| 187 | | | | | | | | |
| 188 | | | | | | | | |
| 189 | | | | | | | | |
| 190 | | | | | | | | |
| 191 | | | | | | | | |
| 192 | 1 | 1 | 1 | 1 | 1 | 1 | 1 | 1 |
| 193 | | | | | | | | |
| 194 | | | | | | | | |
| 195 | | | | | | | | |
| 196 | | | | | | | | |
| 197 | | | | | | | | |
| 198 | | | | | | | | |
| 199 | | | | | | | | |
| 200 | −1 | −1 | −1 | −1 | −1 | −1 | −1 | −1 |
| 201 | | | | | | | | |
| 202 | | | | | | | | |
| 203 | | | | | | | | |
| 204 | | | | | | | | |
| 205 | | | | | | | | |
| 206 | | | | | | | | |
| 207 | | | | | | | | |
| 208 | 1 | 1 | 1 | 1 | 1 | 1 | 1 | 1 |
| 209 | | | | | | | | |
| 210 | | | | | | | | |
| 211 | | | | | | | | |
| 212 | | | | | | | | |
| 213 | | | | | | | | |
| 214 | | | | | | | | |
| 215 | | | | | | | | |
| 216 | −1 | −1 | −1 | −1 | −1 | −1 | −1 | −1 |
| 217 | | | | | | | | |
| 218 | | | | | | | | |
| 219 | | | | | | | | |
| 220 | | | | | | | | |
| 221 | | | | | | | | |
| 222 | | | | | | | | |
| 223 | | | | | | | | |
| 224 | 1 | 1 | 1 | 1 | 1 | 1 | 1 | 1 |
| 225 | | | | | | | | |
| 226 | | | | | | | | |
| 227 | | | | | | | | |
| 228 | | | | | | | | |
| 229 | | | | | | | | |
| 230 | | | | | | | | |
| 231 | | | | | | | | |
| 232 | 1 | 1 | 1 | 1 | 1 | 1 | 1 | 1 |
| 233 | | | | | | | | |
| 234 | | | | | | | | |
| 235 | | | | | | | | |
| 236 | | | | | | | | |
| 237 | | | | | | | | |
| 238 | | | | | | | | |
| 239 | | | | | | | | |
| 240 | 1 | 1 | 1 | 1 | 1 | 1 | 1 | 1 |
| 241 | | | | | | | | |
| 242 | | | | | | | | |
| 243 | | | | | | | | |
| 244 | | | | | | | | |
| 245 | | | | | | | | |
| 246 | | | | | | | | |
| 247 | | | | | | | | |
| 248 | 1 | 1 | 1 | 1 | 1 | 1 | 1 | 1 |
| 249 | | | | | | | | |
| 250 | | | | | | | | |
| 251 | | | | | | | | |
| 252 | | | | | | | | |
| 253 | | | | | | | | |
| 254 | | | | | | | | |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 255 | Null | Null | Null | Null | Null | Null | Null | Null |
| 256 | DC | DC | DC | DC | DC | DC | DC | DC |
| 257 | Null | Null | Null | Null | Null | Null | Null | Null |
| 258 | | | | | | | | |
| 259 | | | | | | | | |
| 260 | | | | | | | | |
| 261 | | | | | | | | |
| 262 | | | | | | | | |
| 263 | | | | | | | | |
| 264 | 1 | 1 | 1 | 1 | 1 | 1 | 1 | 1 |
| 265 | | | | | | | | |
| 266 | | | | | | | | |
| 267 | | | | | | | | |
| 268 | | | | | | | | |
| 269 | | | | | | | | |
| 270 | | | | | | | | |
| 271 | | | | | | | | |
| 272 | −1 | −1 | −1 | −1 | −1 | −1 | −1 | −1 |
| 273 | | | | | | | | |
| 274 | | | | | | | | |
| 275 | | | | | | | | |
| 276 | | | | | | | | |
| 277 | | | | | | | | |
| 278 | | | | | | | | |
| 279 | | | | | | | | |
| 280 | −1 | −1 | −1 | −1 | −1 | −1 | −1 | −1 |
| 281 | | | | | | | | |
| 282 | | | | | | | | |
| 283 | | | | | | | | |
| 284 | | | | | | | | |
| 285 | | | | | | | | |
| 286 | | | | | | | | |
| 287 | | | | | | | | |
| 288 | 1 | 1 | 1 | 1 | 1 | 1 | 1 | 1 |
| 289 | | | | | | | | |
| 290 | | | | | | | | |
| 291 | | | | | | | | |
| 292 | | | | | | | | |
| 293 | | | | | | | | |
| 294 | | | | | | | | |
| 295 | | | | | | | | |
| 296 | 1 | 1 | 1 | 1 | 1 | 1 | 1 | 1 |
| 297 | | | | | | | | |
| 298 | | | | | | | | |
| 299 | | | | | | | | |
| 300 | | | | | | | | |
| 301 | | | | | | | | |
| 302 | | | | | | | | |
| 303 | | | | | | | | |
| 304 | −1 | −1 | −1 | −1 | −1 | −1 | −1 | −1 |
| 305 | | | | | | | | |
| 306 | | | | | | | | |
| 307 | | | | | | | | |
| 308 | | | | | | | | |
| 309 | | | | | | | | |
| 310 | | | | | | | | |
| 311 | | | | | | | | |
| 312 | 1 | 1 | 1 | 1 | 1 | 1 | 1 | 1 |
| 313 | | | | | | | | |
| 314 | | | | | | | | |
| 315 | | | | | | | | |
| 316 | | | | | | | | |
| 317 | | | | | | | | |
| 318 | | | | | | | | |
| 319 | | | | | | | | |
| 320 | −1 | −1 | −1 | −1 | −1 | −1 | −1 | −1 |
| 321 | | | | | | | | |
| 322 | | | | | | | | |
| 323 | | | | | | | | |
| 324 | | | | | | | | |
| 325 | | | | | | | | |
| 326 | | | | | | | | |
| 327 | | | | | | | | |
| 328 | 1 | 1 | 1 | 1 | 1 | 1 | 1 | 1 |
| 329 | | | | | | | | |
| 330 | | | | | | | | |
| 331 | | | | | | | | |
| 332 | | | | | | | | |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 333 | | | | | | | | |
| 334 | | | | | | | | |
| 335 | | | | | | | | |
| 336 | −1 | −1 | −1 | −1 | −1 | −1 | −1 | −1 |
| 337 | | | | | | | | |
| 338 | | | | | | | | |
| 339 | | | | | | | | |
| 340 | | | | | | | | |
| 341 | | | | | | | | |
| 342 | | | | | | | | |
| 343 | | | | | | | | |
| 344 | −1 | −1 | −1 | −1 | −1 | −1 | −1 | −1 |
| 345 | | | | | | | | |
| 346 | | | | | | | | |
| 347 | | | | | | | | |
| 348 | | | | | | | | |
| 349 | | | | | | | | |
| 350 | | | | | | | | |
| 351 | | | | | | | | |
| 352 | −1 | −1 | −1 | −1 | −1 | −1 | −1 | −1 |
| 353 | | | | | | | | |
| 354 | | | | | | | | |
| 355 | | | | | | | | |
| 356 | | | | | | | | |
| 357 | | | | | | | | |
| 358 | | | | | | | | |
| 359 | | | | | | | | |
| 360 | −1 | −1 | −1 | −1 | −1 | −1 | −1 | −1 |
| 361 | | | | | | | | |
| 362 | | | | | | | | |
| 363 | | | | | | | | |
| 364 | | | | | | | | |
| 365 | | | | | | | | |
| 366 | | | | | | | | |
| 367 | | | | | | | | |
| 368 | −1 | −1 | −1 | −1 | −1 | −1 | −1 | −1 |
| 369 | | | | | | | | |
| 370 | | | | | | | | |
| 371 | | | | | | | | |
| 372 | | | | | | | | |
| 373 | | | | | | | | |
| 374 | | | | | | | | |
| 375 | | | | | | | | |
| 376 | 1 | 1 | 1 | 1 | 1 | 1 | 1 | 1 |
| 377 | | | | | | | | |
| 378 | | | | | | | | |
| 379 | | | | | | | | |
| 380 | | | | | | | | |
| 381 | | | | | | | | |
| 382 | | | | | | | | |
| 383 | | | | | | | | |
| 384 | 1 | 1 | 1 | 1 | 1 | 1 | 1 | 1 |
| 385 | | | | | | | | |
| 386 | | | | | | | | |
| 387 | | | | | | | | |
| 388 | | | | | | | | |
| 389 | | | | | | | | |
| 390 | | | | | | | | |
| 391 | | | | | | | | |
| 392 | −1 | −1 | −1 | −1 | −1 | −1 | −1 | −1 |
| 393 | | | | | | | | |
| 394 | | | | | | | | |
| 395 | | | | | | | | |
| 396 | | | | | | | | |
| 397 | | | | | | | | |
| 398 | | | | | | | | |
| 399 | | | | | | | | |
| 400 | −1 | −1 | −1 | −1 | −1 | −1 | −1 | −1 |
| 401 | | | | | | | | |
| 402 | | | | | | | | |
| 403 | | | | | | | | |
| 404 | | | | | | | | |
| 405 | | | | | | | | |
| 406 | | | | | | | | |
| 407 | | | | | | | | |
| 408 | 1 | 1 | 1 | 1 | 1 | 1 | 1 | 1 |
| 409 | | | | | | | | |
| 410 | | | | | | | | |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 411 | | | | | | | | |
| 412 | | | | | | | | |
| 413 | | | | | | | | |
| 414 | | | | | | | | |
| 415 | | | | | | | | |
| 416 | −1 | −1 | −1 | −1 | −1 | −1 | −1 | −1 |
| 417 | | | | | | | | |
| 418 | | | | | | | | |
| 419 | | | | | | | | |
| 420 | | | | | | | | |
| 421 | | | | | | | | |
| 422 | | | | | | | | |
| 423 | | | | | | | | |
| 424 | 1 | 1 | 1 | 1 | 1 | 1 | 1 | 1 |
| 425 | | | | | | | | |
| 426 | | | | | | | | |
| 427 | | | | | | | | |
| 428 | | | | | | | | |
| 429 | | | | | | | | |
| 430 | | | | | | | | |
| 431 | | | | | | | | |
| 432 | −1 | −1 | −1 | −1 | −1 | −1 | −1 | −1 |
| 433 | | | | | | | | |
| 434 | | | | | | | | |
| 435 | | | | | | | | |
| 436 | | | | | | | | |
| 437 | | | | | | | | |
| 438 | | | | | | | | |
| 439 | | | | | | | | |
| 440 | 1 | 1 | 1 | 1 | 1 | 1 | 1 | 1 |
| 441 | | | | | | | | |
| 442 | | | | | | | | |
| 443 | | | | | | | | |
| 444 | | | | | | | | |
| 445 | | | | | | | | |
| 446 | | | | | | | | |
| 447 | | | | | | | | |
| 448 | 1 | 1 | 1 | 1 | 1 | 1 | 1 | 1 |
| 449 | | | | | | | | |
| 450 | | | | | | | | |
| 451 | | | | | | | | |
| 452 | | | | | | | | |
| 453 | | | | | | | | |
| 454 | | | | | | | | |
| 455 | | | | | | | | |
| 456 | 1 | 1 | 1 | 1 | 1 | 1 | 1 | 1 |
| 457 | | | | | | | | |
| 458 | | | | | | | | |
| 459 | | | | | | | | |
| 460 | | | | | | | | |
| 461 | | | | | | | | |
| 462 | | | | | | | | |
| 463 | | | | | | | | |
| 464 | 1 | 1 | 1 | 1 | 1 | 1 | 1 | 1 |
| 465 | | | | | | | | |
| 466 | | | | | | | | |
| 467 | | | | | | | | |
| 468 | | | | | | | | |
| 469 | | | | | | | | |
| 470 | | | | | | | | |
| 471 | | | | | | | | |
| 472 | −1 | −1 | −1 | −1 | −1 | −1 | −1 | −1 |
| 473 | | | | | | | | |
| 474 | | | | | | | | |
| 475 | | | | | | | | |
| 476 | | | | | | | | |
| 477 | | | | | | | | |
| 478 | | | | | | | | |
| 479 | | | | | | | | |
| 480 | −1 | −1 | −1 | −1 | −1 | −1 | −1 | −1 |
| 481 | | | | | | | | |
| 482 | | | | | | | | |
| 483 | | | | | | | | |
| 484 | | | | | | | | |
| 485 | | | | | | | | |
| 486 | | | | | | | | |
| 487 | | | | | | | | |
| 488 | | | | | | | | |

TABLE 1-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 489 | | | | | | | | |
| 490 | GB | GB | GB | GB | GB | GB | GB | GB |
| 491 | GB | GB | GB | GB | GB | GB | GB | GB |
| 492 | GB | GB | GB | GB | GB | GB | GB | GB |
| 493 | GB | GB | GB | GB | GB | GB | GB | GB |
| 494 | GB | GB | GB | GB | GB | GB | GB | GB |
| 495 | GB | GB | GB | GB | GB | GB | GB | GB |
| 496 | GB | GB | GB | GB | GB | GB | GB | GB |
| 497 | GB | GB | GB | GB | GB | GB | GB | GB |
| 498 | GB | GB | GB | GB | GB | GB | GB | GB |
| 499 | GB | GB | GB | GB | GB | GB | GB | GB |
| 500 | GB | GB | GB | GB | GB | GB | GB | GB |
| 501 | GB | GB | GB | GB | GB | GB | GB | GB |
| 502 | GB | GB | GB | GB | GB | GB | GB | GB |
| 503 | GB | GB | GB | GB | GB | GB | GB | GB |
| 504 | GB | GB | GB | GB | GB | GB | GB | GB |
| 505 | GB | GB | GB | GB | GB | GB | GB | GB |
| 506 | GB | GB | GB | GB | GB | GB | GB | GB |
| 507 | GB | GB | GB | GB | GB | GB | GB | GB |
| 508 | GB | GB | GB | GB | GB | GB | GB | GB |
| 509 | GB | GB | GB | GB | GB | GB | GB | GB |
| 510 | GB | GB | GB | GB | GB | GB | GB | GB |
| 511 | GB | GB | GB | GB | GB | GB | GB | GB |

The first 7 OFDMA symbols are supposed to have CRS, and the CRS pattern is the repetition of the LTS pattern in the L-LTF. The LTS of the L-LTF is a part of CRS, and including this, the total 8×8 MIMO configuration can be sounded. However, embodiments are not limited to the 8×8 MIMO sounding, but may be extended to any number of MIMO configuration, such as by adding more OFDMA symbols with the CRS inserted (e.g. as for 12×12 MIMO, 4 more OFDMA symbols, in addition to the existing CRS, have the CRS).

Data Demodulation Reference Sequence Pattern

While the number of symbols into which the CRS is inserted is determined with the number of physical antennas, the number of symbols into which the data demodulation reference sequences (DMRS) is inserted depends on the number of TX streams. In particular, each STA is likely to have a different beam-forming applied in the transmission, and thus the pilot pattern is a resource unit (RU) (8 subcarriers×8 symbols) based design and the number of TX streams is indicated by the scheduler (which can be an AP in the WLAN system) in the DL/UL MAP.

An embodiment sets the different DMRS patterns in accordance with the number of RUs assigned per STA. The document attached hereto labeled CRS-DMRS shows the DMRS pattern for the case of 1 RU per STA. The CRS patterns are reused on the DMRS patterns, and new DMRS pilots are inserted. Those pilots labeled new DMRS are the newly inserted DMRS pilots in addition to the reused CRS pilots.

Table 2 illustrates a DMRS pattern for 3 RUs per STA and Table 3 illustrates a DMRS pattern for 4 RUs per STA.

TABLE 2

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 0 | GB | GB | GB | GB | GB | GB | GB | GB | | |
| 1 | GB | GB | GB | GB | GB | GB | GB | GB | | |
| 2 | GB | GB | GB | GB | GB | GB | GB | GB | | |
| 3 | GB | GB | GB | GB | GB | GB | GB | GB | | |
| 4 | GB | GB | GB | GB | GB | GB | GB | GB | | |
| 5 | GB | GB | GB | GB | GB | GB | GB | GB | | |
| 6 | GB | GB | GB | GB | GB | GB | GB | GB | | |
| 7 | GB | GB | GB | GB | GB | GB | GB | GB | | |
| 8 | GB | GB | GB | GB | GB | GB | GB | GB | | |
| 9 | GB | GB | GB | GB | GB | GB | GB | GB | | |
| 10 | GB | GB | GB | GB | GB | GB | GB | GB | | |
| 11 | GB | GB | GB | GB | GB | GB | GB | GB | | |
| 12 | GB | GB | GB | GB | GB | GB | GB | GB | | |
| 13 | GB | GB | GB | GB | GB | GB | GB | GB | | |
| 14 | GB | GB | GB | GB | GB | GB | GB | GB | | |
| 15 | GB | GB | GB | GB | GB | GB | GB | GB | | |
| 16 | GB | GB | GB | GB | GB | GB | GB | GB | | |
| 17 | GB | GB | GB | GB | GB | GB | GB | GB | | |
| 18 | GB | GB | GB | GB | GB | GB | GB | GB | | |
| 19 | GB | GB | GB | GB | GB | GB | GB | GB | | |
| 20 | GB | GB | GB | GB | GB | GB | GB | GB | | |
| 21 | GB | GB | GB | GB | GB | GB | GB | GB | | |
| 22 | GB | GB | GB | GB | GB | GB | GB | GB | | |
| 23 | | | | | | | | | | |
| 24 | | 1 | 1 | 1 | 1 | 1 | 1 | 1 | 1 | New-DMRS |
| 25 | | | | | | | | | | |
| 26 | | | | | | | | | | |

TABLE 2-continued

| | using L-LTF | OFDMA-1 | OFDMA-2 | OFDMA-3 | OFDMA-4 | OFDMA-5 | OFDMA-6 | OFDMA-7 | | | |
|---|---|---|---|---|---|---|---|---|---|---|---|
| 27 | | | | | | | | | | | |
| 28 | | | | | | | | | | | |
| 29 | | 1 | 1 | 1 | 1 | 1 | 1 | 1 | 1 | New-DMRS | |
| 30 | | | | | | | | | | | |
| 31 | | | | | | | | | | | Same |
| 32 | 1 | 1 | 1 | 1 | 1 | 1 | 1 | 1 | 1 | CRS | STA |
| 33 | | | | | | | | | | | |
| 34 | | | | | | | | | | | |
| 35 | | | | | | | | | | | |
| 36 | | | | | | | | | | | |
| 37 | | | | | | | | | | | |
| 38 | | | | | | | | | | | |
| 39 | | | | | | | | | | | |
| 40 | 1 | 1 | 1 | 1 | 1 | 1 | 1 | 1 | 1 | CRS | |
| 41 | | | | | | | | | | | |
| 42 | | | | | | | | | | | |
| 43 | | | | | | | | | | | |
| 44 | | | | | | | | | | | |
| 45 | | | | | | | | | | | |
| 46 | | | | | | | | | | | |
| 47 | | | | | | | | | | | |
| 48 | 1 | 1 | 1 | 1 | 1 | 1 | 1 | 1 | 1 | CRS | |
| 49 | | | | | | | | | | | |
| 50 | | | | | | | | | | | |
| 51 | | | | | | | | | | | |
| 52 | | | | | | | | | | | |
| 53 | | 1 | 1 | 1 | 1 | 1 | 1 | 1 | 1 | New-DMRS | |
| 54 | | | | | | | | | | | |
| 55 | | | | | | | | | | | Same |
| 56 | 1 | 1 | 1 | 1 | 1 | 1 | 1 | 1 | 1 | CRS | STA |
| 57 | | | | | | | | | | | |
| 58 | | | | | | | | | | | |
| 59 | | | | | | | | | | | |
| 60 | | | | | | | | | | | |
| 61 | | | | | | | | | | | |
| 62 | | | | | | | | | | | |
| 63 | | | | | | | | | | | |
| 64 | −1 | −1 | −1 | −1 | −1 | −1 | −1 | −1 | −1 | CRS | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | | | | | | | |
| 72 | −1 | −1 | −1 | −1 | −1 | −1 | −1 | −1 | −1 | CRS | |
| 73 | | | | | | | | | | | |
| 74 | | | | | | | | | | | |
| 75 | | | | | | | | | | | |
| 76 | | | | | | | | | | | |
| 77 | | −1 | −1 | −1 | −1 | −1 | −1 | −1 | −1 | New-DMRS | |
| 78 | | | | | | | | | | | |
| 79 | | | | | | | | | | | Same |
| 80 | 1 | 1 | 1 | 1 | 1 | 1 | 1 | 1 | 1 | CRS | STA |
| 81 | | | | | | | | | | | |
| 82 | | | | | | | | | | | |
| 83 | | | | | | | | | | | |
| 84 | | | | | | | | | | | |
| 85 | | | | | | | | | | | |
| 86 | | | | | | | | | | | |
| 87 | | | | | | | | | | | |
| 88 | 1 | 1 | 1 | 1 | 1 | 1 | 1 | 1 | 1 | CRS | |
| 89 | | | | | | | | | | | |
| 90 | | | | | | | | | | | |
| 91 | | | | | | | | | | | |
| 92 | | | | | | | | | | | |
| 93 | | | | | | | | | | | |
| 94 | | | | | | | | | | | |
| 95 | | | | | | | | | | | |
| 96 | −1 | −1 | −1 | −1 | −1 | −1 | −1 | −1 | −1 | CRS | |
| 97 | | | | | | | | | | | |
| 98 | | | | | | | | | | | |
| 99 | | | | | | | | | | | |
| 100 | | | | | | | | | | | |
| 101 | | −1 | −1 | −1 | −1 | −1 | −1 | −1 | −1 | New-DMRS | |
| 102 | | | | | | | | | | | |
| 103 | | | | | | | | | | | Same |
| 104 | 1 | 1 | 1 | 1 | 1 | 1 | 1 | 1 | 1 | CRS | STA |

TABLE 2-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 105 | | | | | | | | | | |
| 106 | | | | | | | | | | |
| 107 | | | | | | | | | | |
| 108 | | | | | | | | | | |
| 109 | | | | | | | | | | |
| 110 | | | | | | | | | | |
| 111 | | | | | | | | | | |
| 112 | −1 | −1 | −1 | −1 | −1 | −1 | −1 | −1 | −1 CRS | |
| 113 | | | | | | | | | | |
| 114 | | | | | | | | | | |
| 115 | | | | | | | | | | |
| 116 | | | | | | | | | | |
| 117 | | | | | | | | | | |
| 118 | | | | | | | | | | |
| 119 | | | | | | | | | | |
| 120 | 1 | 1 | 1 | 1 | 1 | 1 | 1 | 1 | 1 CRS | |
| 121 | | | | | | | | | | |
| 122 | | | | | | | | | | |
| 123 | | | | | | | | | | |
| 124 | | | | | | | | | | |
| 125 | | 1 | 1 | 1 | 1 | 1 | 1 | 1 | 1 New-DMRS | |
| 126 | | | | | | | | | | |
| 127 | | | | | | | | | | | Same |
| 128 | 1 | 1 | 1 | 1 | 1 | 1 | 1 | 1 | 1 CRS | STA |
| 129 | | | | | | | | | | |
| 130 | | | | | | | | | | |
| 131 | | | | | | | | | | |
| 132 | | | | | | | | | | |
| 133 | | | | | | | | | | |
| 134 | | | | | | | | | | |
| 135 | | | | | | | | | | |
| 136 | 1 | 1 | 1 | 1 | 1 | 1 | 1 | 1 | 1 CRS | |
| 137 | | | | | | | | | | |
| 138 | | | | | | | | | | |
| 139 | | | | | | | | | | |
| 140 | | | | | | | | | | |
| 141 | | | | | | | | | | |
| 142 | | | | | | | | | | |
| 143 | | | | | | | | | | |
| 144 | 1 | 1 | 1 | 1 | 1 | 1 | 1 | 1 | 1 CRS | |
| 145 | | | | | | | | | | |
| 146 | | | | | | | | | | |
| 147 | | | | | | | | | | |
| 148 | | | | | | | | | | |
| 149 | | 1 | 1 | 1 | 1 | 1 | 1 | 1 | 1 New-DMRS | |
| 150 | | | | | | | | | | |
| 151 | | | | | | | | | | | Same |
| 152 | 1 | 1 | 1 | 1 | 1 | 1 | 1 | 1 | 1 CRS | STA |
| 153 | | | | | | | | | | |
| 154 | | | | | | | | | | |
| 155 | | | | | | | | | | |
| 156 | | | | | | | | | | |
| 157 | | | | | | | | | | |
| 158 | | | | | | | | | | |
| 159 | | | | | | | | | | |
| 160 | 1 | 1 | 1 | 1 | 1 | 1 | 1 | 1 | 1 CRS | |
| 161 | | | | | | | | | | |
| 162 | | | | | | | | | | |
| 163 | | | | | | | | | | |
| 164 | | | | | | | | | | |
| 165 | | | | | | | | | | |
| 166 | | | | | | | | | | |
| 167 | | | | | | | | | | |
| 168 | −1 | −1 | −1 | −1 | −1 | −1 | −1 | −1 | −1 CRS | |
| 169 | | | | | | | | | | |
| 170 | | | | | | | | | | |
| 171 | | | | | | | | | | |
| 172 | | | | | | | | | | |
| 173 | | −1 | −1 | −1 | −1 | −1 | −1 | −1 | −1 New-DMRS | |
| 174 | | | | | | | | | | |
| 175 | | | | | | | | | | | Same |
| 176 | −1 | −1 | −1 | −1 | −1 | −1 | −1 | −1 | −1 CRS | STA |
| 177 | | | | | | | | | | |
| 178 | | | | | | | | | | |
| 179 | | | | | | | | | | |
| 180 | | | | | | | | | | |
| 181 | | | | | | | | | | |
| 182 | | | | | | | | | | |

TABLE 2-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 183 | | | | | | | | | | |
| 184 | 1 | 1 | 1 | 1 | 1 | 1 | 1 | 1 | 1 CRS | |
| 185 | | | | | | | | | | |
| 186 | | | | | | | | | | |
| 187 | | | | | | | | | | |
| 188 | | | | | | | | | | |
| 189 | | | | | | | | | | |
| 190 | | | | | | | | | | |
| 191 | | | | | | | | | | |
| 192 | 1 | 1 | 1 | 1 | 1 | 1 | 1 | 1 | 1 CRS | |
| 193 | | | | | | | | | | |
| 194 | | | | | | | | | | |
| 195 | | | | | | | | | | |
| 196 | | | | | | | | | | |
| 197 | | 1 | 1 | 1 | 1 | 1 | 1 | 1 | 1 New-DMRS | |
| 198 | | | | | | | | | | |
| 199 | | | | | | | | | | | Same |
| 200 | −1 | −1 | −1 | −1 | −1 | −1 | −1 | −1 | −1 CRS | STA |
| 201 | | | | | | | | | | |
| 202 | | | | | | | | | | |
| 203 | | | | | | | | | | |
| 204 | | | | | | | | | | |
| 205 | | | | | | | | | | |
| 206 | | | | | | | | | | |
| 207 | | | | | | | | | | |
| 208 | 1 | 1 | 1 | 1 | 1 | 1 | 1 | 1 | 1 CRS | |
| 209 | | | | | | | | | | |
| 210 | | | | | | | | | | |
| 211 | | | | | | | | | | |
| 212 | | | | | | | | | | |
| 213 | | | | | | | | | | |
| 214 | | | | | | | | | | |
| 215 | | | | | | | | | | |
| 216 | −1 | −1 | −1 | −1 | −1 | −1 | −1 | −1 | −1 CRS | |
| 217 | | | | | | | | | | |
| 218 | | | | | | | | | | |
| 219 | | | | | | | | | | |
| 220 | | | | | | | | | | |
| 221 | | −1 | −1 | −1 | −1 | −1 | −1 | −1 | −1 New-DMRS | |
| 222 | | | | | | | | | | |
| 223 | | | | | | | | | | | Same |
| 224 | 1 | 1 | 1 | 1 | 1 | 1 | 1 | 1 | 1 CRS | STA |
| 225 | | | | | | | | | | |
| 226 | | | | | | | | | | |
| 227 | | | | | | | | | | |
| 228 | | | | | | | | | | |
| 229 | | | | | | | | | | |
| 230 | | | | | | | | | | |
| 231 | | | | | | | | | | |
| 232 | 1 | 1 | 1 | 1 | 1 | 1 | 1 | 1 | 1 CRS | |
| 233 | | | | | | | | | | |
| 234 | | | | | | | | | | |
| 235 | | | | | | | | | | |
| 236 | | | | | | | | | | |
| 237 | | | | | | | | | | |
| 238 | | | | | | | | | | |
| 239 | | | | | | | | | | |
| 240 | 1 | 1 | 1 | 1 | 1 | 1 | 1 | 1 | 1 CRS | |
| 241 | | | | | | | | | | |
| 242 | | | | | | | | | | |
| 243 | | | | | | | | | | |
| 244 | | | | | | | | | | |
| 245 | | 1 | 1 | 1 | 1 | 1 | 1 | 1 | 1 New-DMRS | |
| 246 | | | | | | | | | | |
| 247 | | | | | | | | | | |
| 248 | 1 | 1 | 1 | 1 | 1 | 1 | 1 | 1 | 1 CRS | |
| 249 | | | | | | | | | | |
| 250 | | | | | | | | | | |
| 251 | | | | | | | | | | |
| 252 | | | | | | | | | | |
| 253 | | 1 | 1 | 1 | 1 | 1 | 1 | 1 | 1 New-DMRS | |
| 254 | | | | | | | | | | |
| 255 | Null | Null | Null | Null | Null | Null | Null | Null | | |
| 256 | DC | DC | DC | DC | DC | DC | DC | DC | | |
| 257 | Null | Null | Null | Null | Null | Null | Null | Null | | |
| 258 | | | | | | | | | | |
| 259 | | −1 | −1 | −1 | −1 | −1 | −1 | −1 | −1 New-DMRS | |
| 260 | | | | | | | | | | |

TABLE 2-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 261 | | | | | | | | | | |
| 262 | | | | | | | | | | |
| 263 | | | | | | | | | | |
| 264 | 1 | 1 | 1 | 1 | 1 | 1 | 1 | 1 | 1 CRS | |
| 265 | | | | | | | | | | |
| 266 | | | | | | | | | | Same |
| 267 | | −1 | −1 | −1 | −1 | −1 | −1 | −1 | −1 New-DMRS | STA |
| 268 | | | | | | | | | | |
| 269 | | | | | | | | | | |
| 270 | | | | | | | | | | |
| 271 | | | | | | | | | | |
| 272 | −1 | −1 | −1 | −1 | −1 | −1 | −1 | −1 | −1 CRS | |
| 273 | | | | | | | | | | |
| 274 | | | | | | | | | | |
| 275 | | | | | | | | | | |
| 276 | | | | | | | | | | |
| 277 | | | | | | | | | | |
| 278 | | | | | | | | | | |
| 279 | | | | | | | | | | |
| 280 | −1 | −1 | −1 | −1 | −1 | −1 | −1 | −1 | −1 CRS | |
| 281 | | | | | | | | | | |
| 282 | | | | | | | | | | |
| 283 | | | | | | | | | | |
| 284 | | | | | | | | | | |
| 285 | | | | | | | | | | |
| 286 | | | | | | | | | | |
| 287 | | | | | | | | | | |
| 288 | 1 | 1 | 1 | 1 | 1 | 1 | 1 | 1 | 1 CRS | |
| 289 | | | | | | | | | | |
| 290 | | | | | | | | | | Same |
| 291 | | 1 | 1 | 1 | 1 | 1 | 1 | 1 | 1 New-DMRS | STA |
| 292 | | | | | | | | | | |
| 293 | | | | | | | | | | |
| 294 | | | | | | | | | | |
| 295 | | | | | | | | | | |
| 296 | 1 | 1 | 1 | 1 | 1 | 1 | 1 | 1 | 1 CRS | |
| 297 | | | | | | | | | | |
| 298 | | | | | | | | | | |
| 299 | | | | | | | | | | |
| 300 | | | | | | | | | | |
| 301 | | | | | | | | | | |
| 302 | | | | | | | | | | |
| 303 | | | | | | | | | | |
| 304 | −1 | −1 | −1 | −1 | −1 | −1 | −1 | −1 | −1 CRS | |
| 305 | | | | | | | | | | |
| 306 | | | | | | | | | | |
| 307 | | | | | | | | | | |
| 308 | | | | | | | | | | |
| 309 | | | | | | | | | | |
| 310 | | | | | | | | | | |
| 311 | | | | | | | | | | |
| 312 | 1 | 1 | 1 | 1 | 1 | 1 | 1 | 1 | 1 CRS | |
| 313 | | | | | | | | | | |
| 314 | | | | | | | | | | Same |
| 315 | | −1 | −1 | −1 | −1 | −1 | −1 | −1 | −1 New-DMRS | STA |
| 316 | | | | | | | | | | |
| 317 | | | | | | | | | | |
| 318 | | | | | | | | | | |
| 319 | | | | | | | | | | |
| 320 | −1 | −1 | −1 | −1 | −1 | −1 | −1 | −1 | −1 CRS | |
| 321 | | | | | | | | | | |
| 322 | | | | | | | | | | |
| 323 | | | | | | | | | | |
| 324 | | | | | | | | | | |
| 325 | | | | | | | | | | |
| 326 | | | | | | | | | | |
| 327 | | | | | | | | | | |
| 328 | 1 | 1 | 1 | 1 | 1 | 1 | 1 | 1 | 1 CRS | |
| 329 | | | | | | | | | | |
| 330 | | | | | | | | | | |
| 331 | | | | | | | | | | |
| 332 | | | | | | | | | | |
| 333 | | | | | | | | | | |
| 334 | | | | | | | | | | |
| 335 | | | | | | | | | | |
| 336 | −1 | −1 | −1 | −1 | −1 | −1 | −1 | −1 | −1 CRS | |
| 337 | | | | | | | | | | |
| 338 | | | | | | | | | | Same |

TABLE 2-continued

| | using L-LTF | OFDMA-1 | OFDMA-2 | OFDMA-3 | OFDMA-4 | OFDMA-5 | OFDMA-6 | OFDMA-7 | | | |
|---|---|---|---|---|---|---|---|---|---|---|---|
| 339 | | −1 | −1 | −1 | −1 | −1 | −1 | −1 | −1 | New-DMRS | Same STA |
| 340 | | | | | | | | | | | |
| 341 | | | | | | | | | | | |
| 342 | | | | | | | | | | | |
| 343 | | | | | | | | | | | |
| 344 | −1 | −1 | −1 | −1 | −1 | −1 | −1 | −1 | −1 | CRS | |
| 345 | | | | | | | | | | | |
| 346 | | | | | | | | | | | |
| 347 | | | | | | | | | | | |
| 348 | | | | | | | | | | | |
| 349 | | | | | | | | | | | |
| 350 | | | | | | | | | | | |
| 351 | | | | | | | | | | | |
| 352 | −1 | −1 | −1 | −1 | −1 | −1 | −1 | −1 | −1 | CRS | |
| 353 | | | | | | | | | | | |
| 354 | | | | | | | | | | | |
| 355 | | | | | | | | | | | |
| 356 | | | | | | | | | | | |
| 357 | | | | | | | | | | | |
| 358 | | | | | | | | | | | |
| 359 | | | | | | | | | | | |
| 360 | −1 | −1 | −1 | −1 | −1 | −1 | −1 | −1 | −1 | CRS | |
| 361 | | | | | | | | | | | |
| 362 | | | | | | | | | | | | Same |
| 363 | | −1 | −1 | −1 | −1 | −1 | −1 | −1 | −1 | New-DMRS | STA |
| 364 | | | | | | | | | | | |
| 365 | | | | | | | | | | | |
| 366 | | | | | | | | | | | |
| 367 | | | | | | | | | | | |
| 368 | −1 | −1 | −1 | −1 | −1 | −1 | −1 | −1 | −1 | CRS | |
| 369 | | | | | | | | | | | |
| 370 | | | | | | | | | | | |
| 371 | | | | | | | | | | | |
| 372 | | | | | | | | | | | |
| 373 | | | | | | | | | | | |
| 374 | | | | | | | | | | | |
| 375 | | | | | | | | | | | |
| 376 | 1 | 1 | 1 | 1 | 1 | 1 | 1 | 1 | 1 | CRS | |
| 377 | | | | | | | | | | | |
| 378 | | | | | | | | | | | |
| 379 | | | | | | | | | | | |
| 380 | | | | | | | | | | | |
| 381 | | | | | | | | | | | |
| 382 | | | | | | | | | | | |
| 383 | | | | | | | | | | | |
| 384 | 1 | 1 | 1 | 1 | 1 | 1 | 1 | 1 | 1 | CRS | |
| 385 | | | | | | | | | | | |
| 386 | | | | | | | | | | | | Same |
| 387 | | −1 | −1 | −1 | −1 | −1 | −1 | −1 | −1 | New-DMRS | STA |
| 388 | | | | | | | | | | | |
| 389 | | | | | | | | | | | |
| 390 | | | | | | | | | | | |
| 391 | | | | | | | | | | | |
| 392 | −1 | −1 | −1 | −1 | −1 | −1 | −1 | −1 | −1 | CRS | |
| 393 | | | | | | | | | | | |
| 394 | | | | | | | | | | | |
| 395 | | | | | | | | | | | |
| 396 | | | | | | | | | | | |
| 397 | | | | | | | | | | | |
| 398 | | | | | | | | | | | |
| 399 | | | | | | | | | | | |
| 400 | −1 | −1 | −1 | −1 | −1 | −1 | −1 | −1 | −1 | CRS | |
| 401 | | | | | | | | | | | |
| 402 | | | | | | | | | | | |
| 403 | | | | | | | | | | | |
| 404 | | | | | | | | | | | |
| 405 | | | | | | | | | | | |
| 406 | | | | | | | | | | | |
| 407 | | | | | | | | | | | |
| 408 | 1 | 1 | 1 | 1 | 1 | 1 | 1 | 1 | 1 | CRS | |
| 409 | | | | | | | | | | | |
| 410 | | | | | | | | | | | | Same |
| 411 | | −1 | −1 | −1 | −1 | −1 | −1 | −1 | −1 | New-DMRS | STA |
| 412 | | | | | | | | | | | |
| 413 | | | | | | | | | | | |
| 414 | | | | | | | | | | | |
| 415 | | | | | | | | | | | |
| 416 | −1 | −1 | −1 | −1 | −1 | −1 | −1 | −1 | −1 | CRS | |

TABLE 2-continued

| | using L-LTF | OFDMA-1 | OFDMA-2 | OFDMA-3 | OFDMA-4 | OFDMA-5 | OFDMA-6 | OFDMA-7 | | | |
|---|---|---|---|---|---|---|---|---|---|---|---|
| 417 | | | | | | | | | | | |
| 418 | | | | | | | | | | | |
| 419 | | | | | | | | | | | |
| 420 | | | | | | | | | | | |
| 421 | | | | | | | | | | | |
| 422 | | | | | | | | | | | |
| 423 | | | | | | | | | | | |
| 424 | 1 | 1 | 1 | 1 | 1 | 1 | 1 | 1 | 1 | CRS | |
| 425 | | | | | | | | | | | |
| 426 | | | | | | | | | | | |
| 427 | | | | | | | | | | | |
| 428 | | | | | | | | | | | |
| 429 | | | | | | | | | | | |
| 430 | | | | | | | | | | | |
| 431 | | | | | | | | | | | |
| 432 | −1 | −1 | −1 | −1 | −1 | −1 | −1 | −1 | −1 | CRS | |
| 433 | | | | | | | | | | | |
| 434 | | | | | | | | | | | | Same |
| 435 | | 1 | 1 | 1 | 1 | 1 | 1 | 1 | 1 | New-DMRS | STA |
| 436 | | | | | | | | | | | |
| 437 | | | | | | | | | | | |
| 438 | | | | | | | | | | | |
| 439 | | | | | | | | | | | |
| 440 | 1 | 1 | 1 | 1 | 1 | 1 | 1 | 1 | 1 | CRS | |
| 441 | | | | | | | | | | | |
| 442 | | | | | | | | | | | |
| 443 | | | | | | | | | | | |
| 444 | | | | | | | | | | | |
| 445 | | | | | | | | | | | |
| 446 | | | | | | | | | | | |
| 447 | | | | | | | | | | | |
| 448 | 1 | 1 | 1 | 1 | 1 | 1 | 1 | 1 | 1 | CRS | |
| 449 | | | | | | | | | | | |
| 450 | | | | | | | | | | | |
| 451 | | | | | | | | | | | |
| 452 | | | | | | | | | | | |
| 453 | | | | | | | | | | | |
| 454 | | | | | | | | | | | |
| 455 | | | | | | | | | | | |
| 456 | 1 | 1 | 1 | 1 | 1 | 1 | 1 | 1 | 1 | CRS | |
| 457 | | | | | | | | | | | |
| 458 | | | | | | | | | | | | Same |
| 459 | | 1 | 1 | 1 | 1 | 1 | 1 | 1 | 1 | New-DMRS | STA |
| 460 | | | | | | | | | | | |
| 461 | | | | | | | | | | | |
| 462 | | | | | | | | | | | |
| 463 | | | | | | | | | | | |
| 464 | 1 | 1 | 1 | 1 | 1 | 1 | 1 | 1 | 1 | CRS | |
| 465 | | | | | | | | | | | |
| 466 | | | | | | | | | | | |
| 467 | | | | | | | | | | | |
| 468 | | | | | | | | | | | |
| 469 | | | | | | | | | | | |
| 470 | | | | | | | | | | | |
| 471 | | | | | | | | | | | |
| 472 | −1 | −1 | −1 | −1 | −1 | −1 | −1 | −1 | −1 | CRS | |
| 473 | | | | | | | | | | | |
| 474 | | | | | | | | | | | |
| 475 | | | | | | | | | | | |
| 476 | | | | | | | | | | | |
| 477 | | | | | | | | | | | |
| 478 | | | | | | | | | | | |
| 479 | | | | | | | | | | | |
| 480 | −1 | −1 | −1 | −1 | −1 | −1 | −1 | −1 | −1 | CRS | |
| 481 | | | | | | | | | | | |
| 482 | | | | | | | | | | | |
| 483 | | 1 | 1 | 1 | 1 | 1 | 1 | 1 | 1 | New-DMRS | |
| 484 | | | | | | | | | | | |
| 485 | | | | | | | | | | | |
| 486 | | | | | | | | | | | |
| 487 | | | | | | | | | | | |
| 488 | | 1 | 1 | 1 | 1 | 1 | 1 | 1 | 1 | New-DMRS | |
| 489 | | | | | | | | | | | |
| 490 | GB | GB | GB | GB | GB | GB | GB | GB | | | |
| 491 | GB | GB | GB | GB | GB | GB | GB | GB | | | |
| 492 | GB | GB | GB | GB | GB | GB | GB | GB | | | |
| 493 | GB | GB | GB | GB | GB | GB | GB | GB | | | |
| 494 | GB | GB | GB | GB | GB | GB | GB | GB | | | |

TABLE 2-continued

| | using L-LTF | OFDMA-1 | OFDMA-2 | OFDMA-3 | OFDMA-4 | OFDMA-5 | OFDMA-6 | OFDMA-7 |
|---|---|---|---|---|---|---|---|---|
| 495 | GB | GB | GB | GB | GB | GB | GB | GB |
| 496 | GB | GB | GB | GB | GB | GB | GB | GB |
| 497 | GB | GB | GB | GB | GB | GB | GB | GB |
| 498 | GB | GB | GB | GB | GB | GB | GB | GB |
| 499 | GB | GB | GB | GB | GB | GB | GB | GB |
| 500 | GB | GB | GB | GB | GB | GB | GB | GB |
| 501 | GB | GB | GB | GB | GB | GB | GB | GB |
| 502 | GB | GB | GB | GB | GB | GB | GB | GB |
| 503 | GB | GB | GB | GB | GB | GB | GB | GB |
| 504 | GB | GB | GB | GB | GB | GB | GB | GB |
| 505 | GB | GB | GB | GB | GB | GB | GB | GB |
| 506 | GB | GB | GB | GB | GB | GB | GB | GB |
| 507 | GB | GB | GB | GB | GB | GB | GB | GB |
| 508 | GB | GB | GB | GB | GB | GB | GB | GB |
| 509 | GB | GB | GB | GB | GB | GB | GB | GB |
| 510 | GB | GB | GB | GB | GB | GB | GB | GB |
| 511 | GB | GB | GB | GB | GB | GB | GB | GB |

TABLE 3

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 0 | GB | GB | GB | GB | GB | GB | GB | GB | | |
| 1 | GB | GB | GB | GB | GB | GB | GB | GB | | |
| 2 | GB | GB | GB | GB | GB | GB | GB | GB | | |
| 3 | GB | GB | GB | GB | GB | GB | GB | GB | | |
| 4 | GB | GB | GB | GB | GB | GB | GB | GB | | |
| 5 | GB | GB | GB | GB | GB | GB | GB | GB | | |
| 6 | GB | GB | GB | GB | GB | GB | GB | GB | | |
| 7 | GB | GB | GB | GB | GB | GB | GB | GB | | |
| 8 | GB | GB | GB | GB | GB | GB | GB | GB | | |
| 9 | GB | GB | GB | GB | GB | GB | GB | GB | | |
| 10 | GB | GB | GB | GB | GB | GB | GB | GB | | |
| 11 | GB | GB | GB | GB | GB | GB | GB | GB | | |
| 12 | GB | GB | GB | GB | GB | GB | GB | GB | | |
| 13 | GB | GB | GB | GB | GB | GB | GB | GB | | |
| 14 | GB | GB | GB | GB | GB | GB | GB | GB | | |
| 15 | GB | GB | GB | GB | GB | GB | GB | GB | | |
| 16 | GB | GB | GB | GB | GB | GB | GB | GB | | |
| 17 | GB | GB | GB | GB | GB | GB | GB | GB | | |
| 18 | GB | GB | GB | GB | GB | GB | GB | GB | | |
| 19 | GB | GB | GB | GB | GB | GB | GB | GB | | |
| 20 | GB | GB | GB | GB | GB | GB | GB | GB | | |
| 21 | GB | GB | GB | GB | GB | GB | GB | GB | | |
| 22 | GB | GB | GB | GB | GB | GB | GB | GB | | |
| 23 | | | | | | | | | | |
| 24 | | 1 | 1 | 1 | 1 | 1 | 1 | 1 | 1 | New-DMRS |
| 25 | | | | | | | | | | |
| 26 | | | | | | | | | | |
| 27 | | | | | | | | | | |
| 28 | | | | | | | | | | |
| 29 | | 1 | 1 | 1 | 1 | 1 | 1 | 1 | 1 | New-DMRS |
| 30 | | | | | | | | | | |
| 31 | | | | | | | | | | |
| 32 | 1 | 1 | 1 | 1 | 1 | 1 | 1 | 1 | 1 | CRS |
| 33 | | | | | | | | | | |
| 34 | | | | | | | | | | |
| 35 | | | | | | | | | | |
| 36 | | | | | | | | | | |
| 37 | | 1 | 1 | 1 | 1 | 1 | 1 | 1 | 1 | New-DMRS |
| 38 | | | | | | | | | | |
| 39 | | | | | | | | | | |
| 40 | 1 | 1 | 1 | 1 | 1 | 1 | 1 | 1 | 1 | CRS |
| 41 | | | | | | | | | | |
| 42 | | | | | | | | | | |
| 43 | | | | | | | | | | |
| 44 | | | | | | | | | | |
| 45 | | 1 | 1 | 1 | 1 | 1 | 1 | 1 | 1 | New-DMRS |
| 46 | | | | | | | | | | |
| 47 | | | | | | | | | | |
| 48 | 1 | 1 | 1 | 1 | 1 | 1 | 1 | 1 | 1 | CRS |
| 49 | | | | | | | | | | |
| 50 | | | | | | | | | | |
| 51 | | | | | | | | | | |
| 52 | | | | | | | | | | |

TABLE 3-continued

|     | using L-LTF | OFDMA-1 | OFDMA-2 | OFDMA-3 | OFDMA-4 | OFDMA-5 | OFDMA-6 | OFDMA-7 | | |
| --- | --- | --- | --- | --- | --- | --- | --- | --- | --- | --- |
| 53  |    | 1  | 1  | 1  | 1  | 1  | 1  | 1  | 1  | New-DMRS |
| 54  |    |    |    |    |    |    |    |    |    |    |
| 55  |    |    |    |    |    |    |    |    |    |    |
| 56  | 1  | 1  | 1  | 1  | 1  | 1  | 1  | 1  | 1  | CRS |
| 57  |    |    |    |    |    |    |    |    |    |    |
| 58  |    |    |    |    |    |    |    |    |    |    |
| 59  |    |    |    |    |    |    |    |    |    |    |
| 60  |    |    |    |    |    |    |    |    |    |    |
| 61  |    | 1  | 1  | 1  | 1  | 1  | 1  | 1  | 1  | New-DMRS |
| 62  |    |    |    |    |    |    |    |    |    |    |
| 63  |    |    |    |    |    |    |    |    |    |    |
| 64  | −1 | −1 | −1 | −1 | −1 | −1 | −1 | −1 | −1 | CRS |
| 65  |    |    |    |    |    |    |    |    |    |    |
| 66  |    |    |    |    |    |    |    |    |    |    |
| 67  |    |    |    |    |    |    |    |    |    |    |
| 68  |    |    |    |    |    |    |    |    |    |    |
| 69  |    | −1 | −1 | −1 | −1 | −1 | −1 | −1 | −1 | New-DMRS |
| 70  |    |    |    |    |    |    |    |    |    |    |
| 71  |    |    |    |    |    |    |    |    |    |    |
| 72  | −1 | −1 | −1 | −1 | −1 | −1 | −1 | −1 | −1 | CRS |
| 73  |    |    |    |    |    |    |    |    |    |    |
| 74  |    |    |    |    |    |    |    |    |    |    |
| 75  |    |    |    |    |    |    |    |    |    |    |
| 76  |    |    |    |    |    |    |    |    |    |    |
| 77  |    | −1 | −1 | −1 | −1 | −1 | −1 | −1 | −1 | New-DMRS |
| 78  |    |    |    |    |    |    |    |    |    |    |
| 79  |    |    |    |    |    |    |    |    |    |    |
| 80  | 1  | 1  | 1  | 1  | 1  | 1  | 1  | 1  | 1  | CRS |
| 81  |    |    |    |    |    |    |    |    |    |    |
| 82  |    |    |    |    |    |    |    |    |    |    |
| 83  |    |    |    |    |    |    |    |    |    |    |
| 84  |    |    |    |    |    |    |    |    |    |    |
| 85  |    | 1  | 1  | 1  | 1  | 1  | 1  | 1  | 1  | New-DMRS |
| 86  |    |    |    |    |    |    |    |    |    |    |
| 87  |    |    |    |    |    |    |    |    |    |    |
| 88  | 1  | 1  | 1  | 1  | 1  | 1  | 1  | 1  | 1  | CRS |
| 89  |    |    |    |    |    |    |    |    |    |    |
| 90  |    |    |    |    |    |    |    |    |    |    |
| 91  |    |    |    |    |    |    |    |    |    |    |
| 92  |    |    |    |    |    |    |    |    |    |    |
| 93  |    | 1  | 1  | 1  | 1  | 1  | 1  | 1  | 1  | New-DMRS |
| 94  |    |    |    |    |    |    |    |    |    |    |
| 95  |    |    |    |    |    |    |    |    |    |    |
| 96  | −1 | −1 | −1 | −1 | −1 | −1 | −1 | −1 | −1 | CRS |
| 97  |    |    |    |    |    |    |    |    |    |    |
| 98  |    |    |    |    |    |    |    |    |    |    |
| 99  |    |    |    |    |    |    |    |    |    |    |
| 100 |    |    |    |    |    |    |    |    |    |    |
| 101 |    | −1 | −1 | −1 | −1 | −1 | −1 | −1 | −1 | New-DMRS |
| 102 |    |    |    |    |    |    |    |    |    |    |
| 103 |    |    |    |    |    |    |    |    |    |    |
| 104 | 1  | 1  | 1  | 1  | 1  | 1  | 1  | 1  | 1  | CRS |
| 105 |    |    |    |    |    |    |    |    |    |    |
| 106 |    |    |    |    |    |    |    |    |    |    |
| 107 |    |    |    |    |    |    |    |    |    |    |
| 108 |    |    |    |    |    |    |    |    |    |    |
| 109 |    | 1  | 1  | 1  | 1  | 1  | 1  | 1  | 1  | New-DMRS |
| 110 |    |    |    |    |    |    |    |    |    |    |
| 111 |    |    |    |    |    |    |    |    |    |    |
| 112 | −1 | −1 | −1 | −1 | −1 | −1 | −1 | −1 | −1 | CRS |
| 113 |    |    |    |    |    |    |    |    |    |    |
| 114 |    |    |    |    |    |    |    |    |    |    |
| 115 |    |    |    |    |    |    |    |    |    |    |
| 116 |    |    |    |    |    |    |    |    |    |    |
| 117 |    | −1 | −1 | −1 | −1 | −1 | −1 | −1 | −1 | New-DMRS |
| 118 |    |    |    |    |    |    |    |    |    |    |
| 119 |    |    |    |    |    |    |    |    |    |    |
| 120 | 1  | 1  | 1  | 1  | 1  | 1  | 1  | 1  | 1  | CRS |
| 121 |    |    |    |    |    |    |    |    |    |    |
| 122 |    |    |    |    |    |    |    |    |    |    |
| 123 |    |    |    |    |    |    |    |    |    |    |
| 124 |    |    |    |    |    |    |    |    |    |    |
| 125 |    | 1  | 1  | 1  | 1  | 1  | 1  | 1  | 1  | New-DMRS |
| 126 |    |    |    |    |    |    |    |    |    |    |
| 127 |    |    |    |    |    |    |    |    |    |    |
| 128 | 1  | 1  | 1  | 1  | 1  | 1  | 1  | 1  | 1  | CRS |
| 129 |    |    |    |    |    |    |    |    |    |    |
| 130 |    |    |    |    |    |    |    |    |    |    |

TABLE 3-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 131 | | | | | | | | | | |
| 132 | | | | | | | | | | |
| 133 | | 1 | 1 | 1 | 1 | 1 | 1 | 1 | 1 | New-DMRS |
| 134 | | | | | | | | | | |
| 135 | | | | | | | | | | |
| 136 | 1 | 1 | 1 | 1 | 1 | 1 | 1 | 1 | 1 | CRS |
| 137 | | | | | | | | | | |
| 138 | | | | | | | | | | |
| 139 | | | | | | | | | | |
| 140 | | | | | | | | | | |
| 141 | | 1 | 1 | 1 | 1 | 1 | 1 | 1 | 1 | New-DMRS |
| 142 | | | | | | | | | | |
| 143 | | | | | | | | | | |
| 144 | 1 | 1 | 1 | 1 | 1 | 1 | 1 | 1 | 1 | CRS |
| 145 | | | | | | | | | | |
| 146 | | | | | | | | | | |
| 147 | | | | | | | | | | |
| 148 | | | | | | | | | | |
| 149 | | 1 | 1 | 1 | 1 | 1 | 1 | 1 | 1 | New-DMRS |
| 150 | | | | | | | | | | |
| 151 | | | | | | | | | | |
| 152 | 1 | 1 | 1 | 1 | 1 | 1 | 1 | 1 | 1 | CRS |
| 153 | | | | | | | | | | |
| 154 | | | | | | | | | | |
| 155 | | | | | | | | | | |
| 156 | | | | | | | | | | |
| 157 | | 1 | 1 | 1 | 1 | 1 | 1 | 1 | 1 | New-DMRS |
| 158 | | | | | | | | | | |
| 159 | | | | | | | | | | |
| 160 | 1 | 1 | 1 | 1 | 1 | 1 | 1 | 1 | 1 | CRS |
| 161 | | | | | | | | | | |
| 162 | | | | | | | | | | |
| 163 | | | | | | | | | | |
| 164 | | | | | | | | | | |
| 165 | | 1 | 1 | 1 | 1 | 1 | 1 | 1 | 1 | New-DMRS |
| 166 | | | | | | | | | | |
| 167 | | | | | | | | | | |
| 168 | −1 | −1 | −1 | −1 | −1 | −1 | −1 | −1 | −1 | CRS |
| 169 | | | | | | | | | | |
| 170 | | | | | | | | | | |
| 171 | | | | | | | | | | |
| 172 | | | | | | | | | | |
| 173 | | −1 | −1 | −1 | −1 | −1 | −1 | −1 | −1 | New-DMRS |
| 174 | | | | | | | | | | |
| 175 | | | | | | | | | | |
| 176 | −1 | −1 | −1 | −1 | −1 | −1 | −1 | −1 | −1 | CRS |
| 177 | | | | | | | | | | |
| 178 | | | | | | | | | | |
| 179 | | | | | | | | | | |
| 180 | | | | | | | | | | |
| 181 | | −1 | −1 | −1 | −1 | −1 | −1 | −1 | −1 | New-DMRS |
| 182 | | | | | | | | | | |
| 183 | | | | | | | | | | |
| 184 | 1 | 1 | 1 | 1 | 1 | 1 | 1 | 1 | 1 | CRS |
| 185 | | | | | | | | | | |
| 186 | | | | | | | | | | |
| 187 | | | | | | | | | | |
| 188 | | | | | | | | | | |
| 189 | | 1 | 1 | 1 | 1 | 1 | 1 | 1 | 1 | New-DMRS |
| 190 | | | | | | | | | | |
| 191 | | | | | | | | | | |
| 192 | 1 | 1 | 1 | 1 | 1 | 1 | 1 | 1 | 1 | CRS |
| 193 | | | | | | | | | | |
| 194 | | | | | | | | | | |
| 195 | | | | | | | | | | |
| 196 | | | | | | | | | | |
| 197 | | 1 | 1 | 1 | 1 | 1 | 1 | 1 | 1 | New-DMRS |
| 198 | | | | | | | | | | |
| 199 | | | | | | | | | | |
| 200 | −1 | −1 | −1 | −1 | −1 | −1 | −1 | −1 | −1 | CRS |
| 201 | | | | | | | | | | |
| 202 | | | | | | | | | | |
| 203 | | | | | | | | | | |
| 204 | | | | | | | | | | |
| 205 | | −1 | −1 | −1 | −1 | −1 | −1 | −1 | −1 | New-DMRS |
| 206 | | | | | | | | | | |
| 207 | | | | | | | | | | |
| 208 | 1 | 1 | 1 | 1 | 1 | 1 | 1 | 1 | 1 | CRS |

TABLE 3-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 209 | | | | | | | | | | |
| 210 | | | | | | | | | | |
| 211 | | | | | | | | | | |
| 212 | | | | | | | | | | |
| 213 | | 1 | 1 | 1 | 1 | 1 | 1 | 1 | 1 | New-DMRS |
| 214 | | | | | | | | | | |
| 215 | | | | | | | | | | |
| 216 | −1 | −1 | −1 | −1 | −1 | −1 | −1 | −1 | −1 | CRS |
| 217 | | | | | | | | | | |
| 218 | | | | | | | | | | |
| 219 | | | | | | | | | | |
| 220 | | | | | | | | | | |
| 221 | | −1 | −1 | −1 | −1 | −1 | −1 | −1 | −1 | New-DMRS |
| 222 | | | | | | | | | | |
| 223 | | | | | | | | | | |
| 224 | 1 | 1 | 1 | 1 | 1 | 1 | 1 | 1 | 1 | CRS |
| 225 | | | | | | | | | | |
| 226 | | | | | | | | | | |
| 227 | | | | | | | | | | |
| 228 | | | | | | | | | | |
| 229 | | 1 | 1 | 1 | 1 | 1 | 1 | 1 | 1 | New-DMRS |
| 230 | | | | | | | | | | |
| 231 | | | | | | | | | | |
| 232 | 1 | 1 | 1 | 1 | 1 | 1 | 1 | 1 | 1 | CRS |
| 233 | | | | | | | | | | |
| 234 | | | | | | | | | | |
| 235 | | | | | | | | | | |
| 236 | | | | | | | | | | |
| 237 | | 1 | 1 | 1 | 1 | 1 | 1 | 1 | 1 | New-DMRS |
| 238 | | | | | | | | | | |
| 239 | | | | | | | | | | |
| 240 | 1 | 1 | 1 | 1 | 1 | 1 | 1 | 1 | 1 | CRS |
| 241 | | | | | | | | | | |
| 242 | | | | | | | | | | |
| 243 | | | | | | | | | | |
| 244 | | | | | | | | | | |
| 245 | | 1 | 1 | 1 | 1 | 1 | 1 | 1 | 1 | New-DMRS |
| 246 | | | | | | | | | | |
| 247 | | | | | | | | | | |
| 248 | 1 | 1 | 1 | 1 | 1 | 1 | 1 | 1 | 1 | CRS |
| 249 | | | | | | | | | | |
| 250 | | | | | | | | | | |
| 251 | | | | | | | | | | |
| 252 | | | | | | | | | | |
| 253 | | 1 | 1 | 1 | 1 | 1 | 1 | 1 | 1 | New-DMRS |
| 254 | | | | | | | | | | |
| 255 | Null | Null | Null | Null | Null | Null | Null | Null | | |
| 256 | DC | DC | DC | DC | DC | DC | DC | DC | | |
| 257 | Null | Null | Null | Null | Null | Null | Null | Null | | |
| 258 | | | | | | | | | | |
| 259 | | −1 | −1 | −1 | −1 | −1 | −1 | −1 | −1 | New-DMRS |
| 260 | | | | | | | | | | |
| 261 | | | | | | | | | | |
| 262 | | | | | | | | | | |
| 263 | | | | | | | | | | |
| 264 | 1 | 1 | 1 | 1 | 1 | 1 | 1 | 1 | 1 | CRS |
| 265 | | | | | | | | | | |
| 266 | | | | | | | | | | |
| 267 | | −1 | −1 | −1 | −1 | −1 | −1 | −1 | −1 | New-DMRS |
| 268 | | | | | | | | | | |
| 269 | | | | | | | | | | |
| 270 | | | | | | | | | | |
| 271 | | | | | | | | | | |
| 272 | −1 | −1 | −1 | −1 | −1 | −1 | −1 | −1 | −1 | CRS |
| 273 | | | | | | | | | | |
| 274 | | | | | | | | | | |
| 275 | | −1 | −1 | −1 | −1 | −1 | −1 | −1 | −1 | New-DMRS |
| 276 | | | | | | | | | | |
| 277 | | | | | | | | | | |
| 278 | | | | | | | | | | |
| 279 | | | | | | | | | | |
| 280 | −1 | −1 | −1 | −1 | −1 | −1 | −1 | −1 | −1 | CRS |
| 281 | | | | | | | | | | |
| 282 | | | | | | | | | | |
| 283 | | 1 | 1 | 1 | 1 | 1 | 1 | 1 | 1 | New-DMRS |
| 284 | | | | | | | | | | |
| 285 | | | | | | | | | | |
| 286 | | | | | | | | | | |

TABLE 3-continued

|     | using L-LTF | OFDMA-1 | OFDMA-2 | OFDMA-3 | OFDMA-4 | OFDMA-5 | OFDMA-6 | OFDMA-7 |    |         |
|-----|-------------|---------|---------|---------|---------|---------|---------|---------|----|---------|
| 287 |             |         |         |         |         |         |         |         |    |         |
| 288 | 1           | 1       | 1       | 1       | 1       | 1       | 1       | 1       | 1  | CRS     |
| 289 |             |         |         |         |         |         |         |         |    |         |
| 290 |             |         |         |         |         |         |         |         |    |         |
| 291 |             | 1       | 1       | 1       | 1       | 1       | 1       | 1       | 1  | New-DMRS |
| 292 |             |         |         |         |         |         |         |         |    |         |
| 293 |             |         |         |         |         |         |         |         |    |         |
| 294 |             |         |         |         |         |         |         |         |    |         |
| 295 |             |         |         |         |         |         |         |         |    |         |
| 296 | 1           | 1       | 1       | 1       | 1       | 1       | 1       | 1       | 1  | CRS     |
| 297 |             |         |         |         |         |         |         |         |    |         |
| 298 |             |         |         |         |         |         |         |         |    |         |
| 299 |             | −1      | −1      | −1      | −1      | −1      | −1      | −1      | −1 | New-DMRS |
| 300 |             |         |         |         |         |         |         |         |    |         |
| 301 |             |         |         |         |         |         |         |         |    |         |
| 302 |             |         |         |         |         |         |         |         |    |         |
| 303 |             |         |         |         |         |         |         |         |    |         |
| 304 | −1          | −1      | −1      | −1      | −1      | −1      | −1      | −1      | −1 | CRS     |
| 305 |             |         |         |         |         |         |         |         |    |         |
| 306 |             |         |         |         |         |         |         |         |    |         |
| 307 |             | 1       | 1       | 1       | 1       | 1       | 1       | 1       | 1  | New-DMRS |
| 308 |             |         |         |         |         |         |         |         |    |         |
| 309 |             |         |         |         |         |         |         |         |    |         |
| 310 |             |         |         |         |         |         |         |         |    |         |
| 311 |             |         |         |         |         |         |         |         |    |         |
| 312 | 1           | 1       | 1       | 1       | 1       | 1       | 1       | 1       | 1  | CRS     |
| 313 |             |         |         |         |         |         |         |         |    |         |
| 314 |             |         |         |         |         |         |         |         |    |         |
| 315 |             | −1      | −1      | −1      | −1      | −1      | −1      | −1      | −1 | New-DMRS |
| 316 |             |         |         |         |         |         |         |         |    |         |
| 317 |             |         |         |         |         |         |         |         |    |         |
| 318 |             |         |         |         |         |         |         |         |    |         |
| 319 |             |         |         |         |         |         |         |         |    |         |
| 320 | −1          | −1      | −1      | −1      | −1      | −1      | −1      | −1      | −1 | CRS     |
| 321 |             |         |         |         |         |         |         |         |    |         |
| 322 |             |         |         |         |         |         |         |         |    |         |
| 323 |             | 1       | 1       | 1       | 1       | 1       | 1       | 1       | 1  | New-DMRS |
| 324 |             |         |         |         |         |         |         |         |    |         |
| 325 |             |         |         |         |         |         |         |         |    |         |
| 326 |             |         |         |         |         |         |         |         |    |         |
| 327 |             |         |         |         |         |         |         |         |    |         |
| 328 | 1           | 1       | 1       | 1       | 1       | 1       | 1       | 1       | 1  | CRS     |
| 329 |             |         |         |         |         |         |         |         |    |         |
| 330 |             |         |         |         |         |         |         |         |    |         |
| 331 |             | −1      | −1      | −1      | −1      | −1      | −1      | −1      | −1 | New-DMRS |
| 332 |             |         |         |         |         |         |         |         |    |         |
| 333 |             |         |         |         |         |         |         |         |    |         |
| 334 |             |         |         |         |         |         |         |         |    |         |
| 335 |             |         |         |         |         |         |         |         |    |         |
| 336 | −1          | −1      | −1      | −1      | −1      | −1      | −1      | −1      | −1 | CRS     |
| 337 |             |         |         |         |         |         |         |         |    |         |
| 338 |             |         |         |         |         |         |         |         |    |         |
| 339 |             | −1      | −1      | −1      | −1      | −1      | −1      | −1      | −1 | New-DMRS |
| 340 |             |         |         |         |         |         |         |         |    |         |
| 341 |             |         |         |         |         |         |         |         |    |         |
| 342 |             |         |         |         |         |         |         |         |    |         |
| 343 |             |         |         |         |         |         |         |         |    |         |
| 344 | −1          | −1      | −1      | −1      | −1      | −1      | −1      | −1      | −1 | CRS     |
| 345 |             |         |         |         |         |         |         |         |    |         |
| 346 |             |         |         |         |         |         |         |         |    |         |
| 347 |             | −1      | −1      | −1      | −1      | −1      | −1      | −1      | −1 | New-DMRS |
| 348 |             |         |         |         |         |         |         |         |    |         |
| 349 |             |         |         |         |         |         |         |         |    |         |
| 350 |             |         |         |         |         |         |         |         |    |         |
| 351 |             |         |         |         |         |         |         |         |    |         |
| 352 | −1          | −1      | −1      | −1      | −1      | −1      | −1      | −1      | −1 | CRS     |
| 353 |             |         |         |         |         |         |         |         |    |         |
| 354 |             |         |         |         |         |         |         |         |    |         |
| 355 |             | −1      | −1      | −1      | −1      | −1      | −1      | −1      | −1 | New-DMRS |
| 356 |             |         |         |         |         |         |         |         |    |         |
| 357 |             |         |         |         |         |         |         |         |    |         |
| 358 |             |         |         |         |         |         |         |         |    |         |
| 359 |             |         |         |         |         |         |         |         |    |         |
| 360 | −1          | −1      | −1      | −1      | −1      | −1      | −1      | −1      | −1 | CRS     |
| 361 |             |         |         |         |         |         |         |         |    |         |
| 362 |             |         |         |         |         |         |         |         |    |         |
| 363 |             | −1      | −1      | −1      | −1      | −1      | −1      | −1      | −1 | New-DMRS |
| 364 |             |         |         |         |         |         |         |         |    |         |

TABLE 3-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 365 | | | | | | | | | | |
| 366 | | | | | | | | | | |
| 367 | | | | | | | | | | |
| 368 | −1 | −1 | −1 | −1 | −1 | −1 | −1 | −1 | −1 | CRS |
| 369 | | | | | | | | | | |
| 370 | | | | | | | | | | |
| 371 | | 1 | 1 | 1 | 1 | 1 | 1 | 1 | 1 | New-DMRS |
| 372 | | | | | | | | | | |
| 373 | | | | | | | | | | |
| 374 | | | | | | | | | | |
| 375 | | | | | | | | | | |
| 376 | 1 | 1 | 1 | 1 | 1 | 1 | 1 | 1 | 1 | CRS |
| 377 | | | | | | | | | | |
| 378 | | | | | | | | | | |
| 379 | | 1 | 1 | 1 | 1 | 1 | 1 | 1 | 1 | New-DMRS |
| 380 | | | | | | | | | | |
| 381 | | | | | | | | | | |
| 382 | | | | | | | | | | |
| 383 | | | | | | | | | | |
| 384 | 1 | 1 | 1 | 1 | 1 | 1 | 1 | 1 | 1 | CRS |
| 385 | | | | | | | | | | |
| 386 | | | | | | | | | | |
| 387 | | −1 | −1 | −1 | −1 | −1 | −1 | −1 | −1 | New-DMRS |
| 388 | | | | | | | | | | |
| 389 | | | | | | | | | | |
| 390 | | | | | | | | | | |
| 391 | | | | | | | | | | |
| 392 | −1 | −1 | −1 | −1 | −1 | −1 | −1 | −1 | −1 | CRS |
| 393 | | | | | | | | | | |
| 394 | | | | | | | | | | |
| 395 | | −1 | −1 | −1 | −1 | −1 | −1 | −1 | −1 | New-DMRS |
| 396 | | | | | | | | | | |
| 397 | | | | | | | | | | |
| 398 | | | | | | | | | | |
| 399 | | | | | | | | | | |
| 400 | −1 | −1 | −1 | −1 | −1 | −1 | −1 | −1 | −1 | CRS |
| 401 | | | | | | | | | | |
| 402 | | | | | | | | | | |
| 403 | | 1 | 1 | 1 | 1 | 1 | 1 | 1 | 1 | New-DMRS |
| 404 | | | | | | | | | | |
| 405 | | | | | | | | | | |
| 406 | | | | | | | | | | |
| 407 | | | | | | | | | | |
| 408 | 1 | 1 | 1 | 1 | 1 | 1 | 1 | 1 | 1 | CRS |
| 409 | | | | | | | | | | |
| 410 | | | | | | | | | | |
| 411 | | −1 | −1 | −1 | −1 | −1 | −1 | −1 | −1 | New-DMRS |
| 412 | | | | | | | | | | |
| 413 | | | | | | | | | | |
| 414 | | | | | | | | | | |
| 415 | | | | | | | | | | |
| 416 | −1 | −1 | −1 | −1 | −1 | −1 | −1 | −1 | −1 | CRS |
| 417 | | | | | | | | | | |
| 418 | | | | | | | | | | |
| 419 | | 1 | 1 | 1 | 1 | 1 | 1 | 1 | 1 | New-DMRS |
| 420 | | | | | | | | | | |
| 421 | | | | | | | | | | |
| 422 | | | | | | | | | | |
| 423 | | | | | | | | | | |
| 424 | 1 | 1 | 1 | 1 | 1 | 1 | 1 | 1 | 1 | CRS |
| 425 | | | | | | | | | | |
| 426 | | | | | | | | | | |
| 427 | | −1 | −1 | −1 | −1 | −1 | −1 | −1 | −1 | New-DMRS |
| 428 | | | | | | | | | | |
| 429 | | | | | | | | | | |
| 430 | | | | | | | | | | |
| 431 | | | | | | | | | | |
| 432 | −1 | −1 | −1 | −1 | −1 | −1 | −1 | −1 | −1 | CRS |
| 433 | | | | | | | | | | |
| 434 | | | | | | | | | | |
| 435 | | 1 | 1 | 1 | 1 | 1 | 1 | 1 | 1 | New-DMRS |
| 436 | | | | | | | | | | |
| 437 | | | | | | | | | | |
| 438 | | | | | | | | | | |
| 439 | | | | | | | | | | |
| 440 | 1 | 1 | 1 | 1 | 1 | 1 | 1 | 1 | 1 | CRS |
| 441 | | | | | | | | | | |
| 442 | | | | | | | | | | |

TABLE 3-continued

| | using L-LTF | OFDMA-1 | OFDMA-2 | OFDMA-3 | OFDMA-4 | OFDMA-5 | OFDMA-6 | OFDMA-7 | | |
|---|---|---|---|---|---|---|---|---|---|---|
| 443 | | 1 | 1 | 1 | 1 | 1 | 1 | 1 | 1 | New-DMRS |
| 444 | | | | | | | | | | |
| 445 | | | | | | | | | | |
| 446 | | | | | | | | | | |
| 447 | | | | | | | | | | |
| 448 | 1 | 1 | 1 | 1 | 1 | 1 | 1 | 1 | 1 | CRS |
| 449 | | | | | | | | | | |
| 450 | | | | | | | | | | |
| 451 | | 1 | 1 | 1 | 1 | 1 | 1 | 1 | 1 | New-DMRS |
| 452 | | | | | | | | | | |
| 453 | | | | | | | | | | |
| 454 | | | | | | | | | | |
| 455 | | | | | | | | | | |
| 456 | 1 | 1 | 1 | 1 | 1 | 1 | 1 | 1 | 1 | CRS |
| 457 | | | | | | | | | | |
| 458 | | | | | | | | | | |
| 459 | | 1 | 1 | 1 | 1 | 1 | 1 | 1 | 1 | New-DMRS |
| 460 | | | | | | | | | | |
| 461 | | | | | | | | | | |
| 462 | | | | | | | | | | |
| 463 | | | | | | | | | | |
| 464 | 1 | 1 | 1 | 1 | 1 | 1 | 1 | 1 | 1 | CRS |
| 465 | | | | | | | | | | |
| 466 | | | | | | | | | | |
| 467 | | −1 | −1 | −1 | −1 | −1 | −1 | −1 | −1 | New-DMRS |
| 468 | | | | | | | | | | |
| 469 | | | | | | | | | | |
| 470 | | | | | | | | | | |
| 471 | | | | | | | | | | |
| 472 | −1 | −1 | −1 | −1 | −1 | −1 | −1 | −1 | −1 | CRS |
| 473 | | | | | | | | | | |
| 474 | | | | | | | | | | |
| 475 | | −1 | −1 | −1 | −1 | −1 | −1 | −1 | −1 | New-DMRS |
| 476 | | | | | | | | | | |
| 477 | | | | | | | | | | |
| 478 | | | | | | | | | | |
| 479 | | | | | | | | | | |
| 480 | −1 | −1 | −1 | −1 | −1 | −1 | −1 | −1 | −1 | CRS |
| 481 | | | | | | | | | | |
| 482 | | | | | | | | | | |
| 483 | | 1 | 1 | 1 | 1 | 1 | 1 | 1 | 1 | New-DMRS |
| 484 | | | | | | | | | | |
| 485 | | | | | | | | | | |
| 486 | | | | | | | | | | |
| 487 | | | | | | | | | | |
| 488 | | 1 | 1 | 1 | 1 | 1 | 1 | 1 | 1 | New-DMRS |
| 489 | | | | | | | | | | |
| 490 | | GB | GB | GB | GB | GB | GB | GB | GB | |
| 491 | | GB | GB | GB | GB | GB | GB | GB | GB | |
| 492 | | GB | GB | GB | GB | GB | GB | GB | GB | |
| 493 | | GB | GB | GB | GB | GB | GB | GB | GB | |
| 494 | | GB | GB | GB | GB | GB | GB | GB | GB | |
| 495 | | GB | GB | GB | GB | GB | GB | GB | GB | |
| 496 | | GB | GB | GB | GB | GB | GB | GB | GB | |
| 497 | | GB | GB | GB | GB | GB | GB | GB | GB | |
| 498 | | GB | GB | GB | GB | GB | GB | GB | GB | |
| 499 | | GB | GB | GB | GB | GB | GB | GB | GB | |
| 500 | | GB | GB | GB | GB | GB | GB | GB | GB | |
| 501 | | GB | GB | GB | GB | GB | GB | GB | GB | |
| 502 | | GB | GB | GB | GB | GB | GB | GB | GB | |
| 503 | | GB | GB | GB | GB | GB | GB | GB | GB | |
| 504 | | GB | GB | GB | GB | GB | GB | GB | GB | |
| 505 | | GB | GB | GB | GB | GB | GB | GB | GB | |
| 506 | | GB | GB | GB | GB | GB | GB | GB | GB | |
| 507 | | GB | GB | GB | GB | GB | GB | GB | GB | |
| 508 | | GB | GB | GB | GB | GB | GB | GB | GB | |
| 509 | | GB | GB | GB | GB | GB | GB | GB | GB | |
| 510 | | GB | GB | GB | GB | GB | GB | GB | GB | |
| 511 | | GB | GB | GB | GB | GB | GB | GB | GB | |

When the 3 RUs in the frequency domain are aggregated and assigned for one STA, the DMRS overhead may be reduced by removing pilots from two RUs out of three consecutive RUs. The same principle also applies to the case of four consecutively aggregated RUs per STA. Pilots from 3 RUs out of 4 consecutive RUs may be removed in the frequency domain to reduce the DMRS overhead.

FIG. 5 is a flowchart of an embodiment of a method 500 for generating a frame with a mixed OFDMA frame format. The method 500 begins at block 502 where a wireless network component generates a first portion of a frame including a first FFT size (i.e., a first numerology format). At block 504, the wireless network component generates a second portion of the frame including a second FFT size (i.e., numerology format). At block 506, the second portion of the frame is appended to the end of the first portion of the frame. At block 508, the wireless network component transmits the frame during a single transmission opportunity, after which, the method 500 ends. In an embodiment, the method 500 may be encoded as a set of computer readable instructions and stored on a computer readable storage media that, when implemented by a data processing system, causes the data processing system to execute the method 500.

FIG. 6 is a flowchart of an embodiment of a method 600 for decoding a frame that includes a mixed OFDMA frame format. The method 600 begins at block 602 where a wireless network component receives a frame that includes a mixed OFDMA frame format. At block 604, the wireless network component decodes a first portion of the frame that includes a first FFT size or numerology format. At block 606, the wireless network component decodes a second portion of the frame that includes a second FFT size or numerology format, after which, the method 600 ends. In an embodiment, the method 600 may be encoded as a set of computer readable instructions and stored on a computer readable storage media that, when implemented by a data processing system, causes the data processing system to execute the method 600.

FIG. 7 is a flowchart of an embodiment of a method 700 for decoding with a legacy wireless device a frame that includes a mixed OFDMA frame format that includes a first portion of a frame in a first FFT size or numerology format and a second portion of the frame in a second FFT size or numerology format. The method 700 begins at block 702 where the legacy wireless device receives a frame that includes a mixed OFDMA frame format. At block 704, the legacy wireless device decodes a first portion of the frame that includes a first FFT size or numerology format and determines that the remainder of the frame is in a different format and refrains from decoding the remainder of the frame, after which, the method 700 ends. In an embodiment, the first portion of the frame comprises a legacy format preamble. In an embodiment, the method 700 may be encoded as a set of computer readable instructions and stored on a computer readable storage media that, when implemented by a data processing system, causes the data processing system to execute the method 700.

Figure 8:
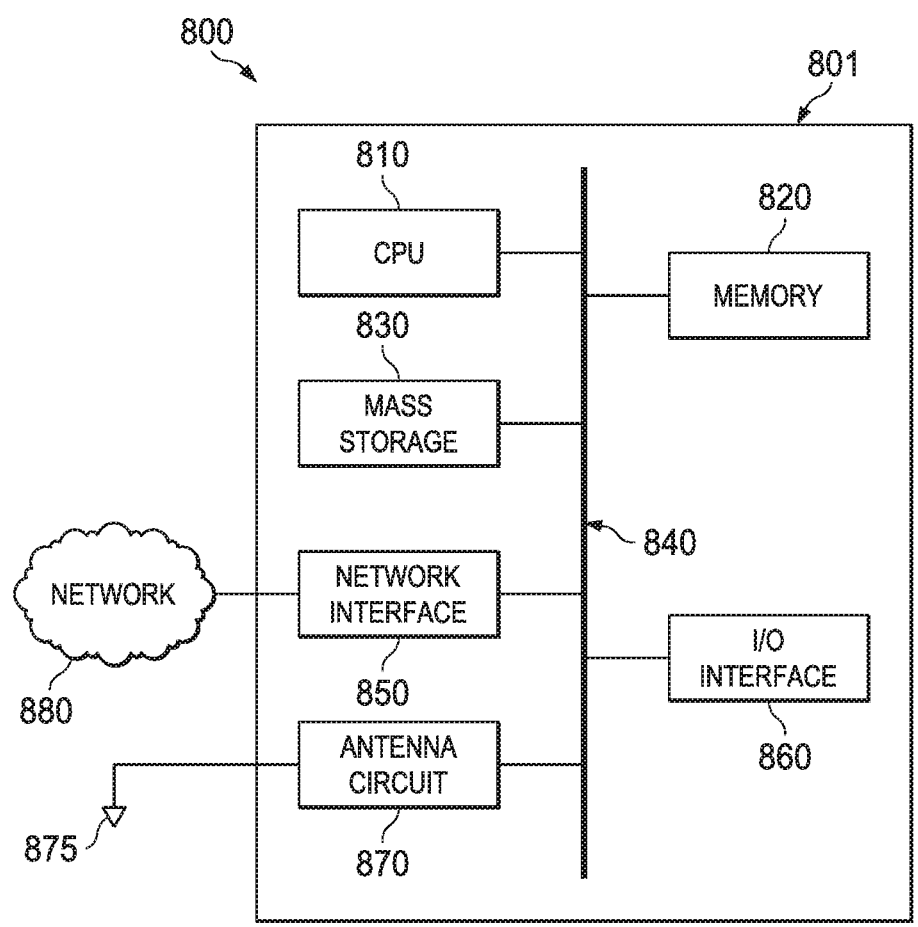
FIG. 8 is a block diagram of a processing system that may be used for implementing the devices and methods disclosed herein.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 870 and antenna element 875 may also provide Bluetooth and/or WiFi connection to other devices.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A method in a network component for transmitting a frame of two different fast Fourier transform (FFT) sizes, comprising:

generating a frame, wherein the frame comprises orthogonal frequency-division multiplexing (OFDM) symbols in two different FFT sizes, wherein the frame comprises a preamble portion and a data portion, wherein the preamble portion comprises a first FFT size and the data portion comprises a second FFT size, wherein the first FFT size and the second FFT size are different, wherein the first FFT size is 64 tones per 20 MHz symbol, wherein the second FFT size is at least 512 tones per 20 MHz symbol, wherein the second FFT size is a high efficiency wireless local area network (HEW) FFT size, wherein at least a first part of the preamble portion is modulated according to a first modulation scheme and at least a second part of the preamble portion is modulated according to a second modulation scheme, wherein the first modulation scheme is binary phase-shift keying (BPSK) modulation and the second modulation scheme is a higher order modulation than BPSK modulation, wherein the preamble portion comprises a legacy short training field (L-STF), a legacy long training field (L-LTF), a legacy signal (L-SIG) field, and a frame control field, wherein the frame control field comprises a downlink/uplink (DL/UL) MAP configuration, and wherein the frame control field is modulated with the second modulation scheme; and transmitting the frame during a single transmission opportunity.

2. The method of claim 1, wherein the second modulation scheme is quadrature phase shift keying (QPSK).

3. The method of claim 1, wherein the preamble portion comprises a legacy format.

4. The method of claim 1, wherein the frame comprises a first field and a second field, and wherein the first field provides automatic gain control (AGC) and synchronization and the second field provides synchronization and channel estimation.

5. The method of claim 1, wherein the preamble portion comprises a first field and a second field that provide information enabling a receiver to estimate two stream channels for two stream space-time block code (STBC).

6. The method of claim 1, wherein the frame control field causes a non-HEW device to stop decoding the frame when encountered by an auto-detection mechanism.

7. The method of claim 1, wherein the frame comprises common reference sequences (CRS) for channel estimation.

8. The method of claim 7, wherein a number of symbols in which the CRS is inserted is determined according to a number of physical antennas.

9. The method of claim 1, wherein the frame comprises a data demodulation reference sequences (DMRS).

10. The method of claim 9, wherein a number of symbols in which the DMRS is inserted is determined according to a number of transmission streams.

11. A wirelessly enabled network component, comprising:
a processor; and
a computer readable storage medium storing programming for execution by the processor, the programming including instructions to:
generate a frame, wherein the frame comprises orthogonal frequency-division multiplexing (OFDM) symbols in two different fast Fourier transform (FFT) sizes, wherein the frame comprises a preamble portion and a data portion, wherein the preamble portion comprises a first FFT size and the data portion comprises a second FFT size, wherein the first FFT size and the second FFT size are different, wherein the first FFT size is 64 tones per 20 MHz symbol, wherein the second FFT size is at least 512 tones per 20 MHz symbol, wherein the second FFT size is a high efficiency wireless local area network (HEW) FFT size, wherein at least a first part of the preamble portion is modulated according to a first modulation scheme and at least a second part of the preamble portion is modulated according to a second modulation scheme, wherein the first modulation scheme is binary phase-shift keying (BPSK) modulation and the second modulation scheme is a higher order modulation than BPSK modulation, wherein the preamble portion comprises a legacy short training field (L-STF), a legacy long training field (L-LTF), a legacy signal (L-SIG) field, and a frame control field, wherein the frame control field comprises a downlink/uplink (DL/UL) MAP configuration, and wherein the frame control field is modulated with the second modulation scheme; and
transmit the frame during a single transmission opportunity.

12. The wirelessly enabled network component of claim 11, wherein the second modulation scheme is quadrature phase shift keying (QPSK).

13. The wirelessly enabled network component of claim 11, wherein the preamble portion comprises a legacy format.

14. The wirelessly enabled network component of claim 11, wherein the frame comprises a first field and a second field, and wherein the first field provides automatic gain control (AGC) and synchronization and the second field provides synchronization and channel estimation.

15. The wirelessly enabled network component of claim 11, wherein the preamble portion comprises a first field and a second field that provide information enabling a receiver to estimate two stream channels for two stream space-time block code (STBC).

16. The wirelessly enabled network component of claim 11, wherein the frame control field causes a non-HEW device to stop decoding the frame when encountered by an auto-detection mechanism.

17. The wirelessly enabled network component of claim 11, wherein the frame comprises common reference sequences (CRS) for channel estimation.

18. The wirelessly enabled network component of claim 17, wherein a number of symbols in which the CRS is inserted is determined according to a number of physical antennas.

19. The wirelessly enabled network component of claim 11, wherein the frame comprises a data demodulation reference sequences (DMRS).

20. The wirelessly enabled network component of claim 19, wherein a number of symbols in which the DMRS is inserted is determined according to a number of transmission streams.

21. A method in a wireless network device, comprising:
receiving a frame, wherein the frame comprises orthogonal frequency-division multiplexing (OFDM) symbols in two different FFT sizes, wherein the frame comprises a preamble portion and a data portion, wherein the preamble portion comprises a first FFT size and the data portion comprises a second FFT size, wherein the first FFT size and the second FFT size are different, wherein the first FFT size is 64 tones per 20 MHz symbol, wherein the second FFT size is at least 512 tones per 20 MHz symbol, wherein the second FFT size is a high efficiency wireless local area network (HEW) FFT size, wherein at least a first part of the preamble portion is modulated according to a first modulation scheme and at least a second part of the preamble portion is modulated according to a second modulation scheme, wherein the first modulation scheme is binary phase-shift keying (BPSK) modulation and the second modulation scheme is a higher order modulation than BPSK modulation, wherein the preamble portion comprises a legacy short training field (L-STF), a legacy long training field (L-LTF), a legacy signal (L-SIG) field, and a frame control field, wherein the frame control field comprises a downlink/uplink (DL/UL) MAP configuration, and wherein the frame control field is modulated with the second modulation scheme;

decoding the preamble portion according to the first FFT size; and decoding the data portion according to the second FFT size.

22. A wireless system, comprising:

a transmitter; and a processor coupled to the transmitter, wherein the processor is configured to generate a frame, wherein the frame comprises orthogonal frequency-division multiplexing (OFDM) symbols in two different fast Fourier transform (FFT) sizes, wherein the frame comprises a preamble portion and a data portion, wherein the preamble portion comprises a first FFT size and the data portion comprises a second FFT size, wherein the first FFT size and the second FFT size are different, wherein the first FFT size is 64 tones per 20 MHz symbol, wherein the second FFT size is at least 512 tones per 20 MHz symbol, wherein the second FFT size is a high efficiency wireless local area network (HEW) FFT size, wherein at least a first part of the preamble portion is modulated according to a first modulation scheme and at least a second part of the preamble portion is modulated according to a second modulation scheme, wherein the first modulation scheme is binary phase-shift keying (BPSK) modulation and the second modulation scheme is a higher order modulation than BPSK modulation, wherein the preamble portion comprises a legacy short training field (L-STF), a legacy long training field (L-LTF), a legacy signal (L-SIG) field, and a frame control field, wherein the frame control field comprises a downlink/uplink (DL/UL) MAP configuration, wherein the frame control field is modulated with the second modulation scheme, and wherein the processor is further configured to cause the transmitter to transmit the frame during a single transmission opportunity.

23. The system of claim 22, wherein the preamble portion comprises a legacy format.

24. The system of claim 22, wherein the frame comprises a first field and a second field, and wherein the first field provides automatic gain control (AGC) and synchronization and the second field provides synchronization and channel estimation.

25. The system of claim 22, wherein the preamble portion comprises a first field and a second field that provide information enabling a receiver to estimate two stream channels for two stream space-time block code (STBC).

26. The system of claim 22, wherein the frame control field causes a non-HEW device to stop decoding the frame when encountered by an auto-detection mechanism.

27. The system of claim 22, wherein the frame comprises common reference sequences (CRS) for channel estimation.

28. The system of claim 27, wherein a number of symbols in which the CRS is inserted is determined according to a number of physical antennas.

29. The system of claim 22, wherein the frame comprises a data demodulation reference sequences (DMRS).

30. The system of claim 29, wherein a number of symbols in which the DMRS is inserted is determined according to a number of transmission streams.

\* \* \* \* \*